United States Patent [19]
Chapman

[11] Patent Number: 5,291,394
[45] Date of Patent: Mar. 1, 1994

[54] MANUFACTURING CONTROL AND CAPACITY PLANNING SYSTEM

[75] Inventor: William Chapman, Scottsdale, Ariz.

[73] Assignee: Motorola, Inc., Schaumburg, Ill.

[21] Appl. No.: 531,969

[22] Filed: Jun. 1, 1990

[51] Int. Cl.$^5$ .................... G06F 15/22; G06F 15/24; G06G 7/52

[52] U.S. Cl. .................... 364/401; 364/148

[58] Field of Search ............... 364/401, 148, 468, 225; 395/925

[56] References Cited

U.S. PATENT DOCUMENTS

| | | | |
|---|---|---|---|
| 3,703,725 | 11/1972 | Gomersell et al. | 444/1 |
| 3,845,286 | 10/1974 | Aronstein et al. | 235/151.1 |
| 4,208,712 | 6/1980 | Deutsch | 364/105 |
| 4,517,637 | 5/1985 | Cassell | 364/138 |
| 4,591,983 | 5/1986 | Bennett et al. | 364/403 |
| 4,628,434 | 12/1986 | Tashiro et al. | 364/130 |
| 4,635,182 | 1/1987 | Hintz | 364/138 |
| 4,648,023 | 3/1987 | Powell | 364/156 |
| 4,670,848 | 6/1987 | Schramm | 364/513 |
| 4,697,242 | 9/1987 | Holland et al. | 364/513 |
| 4,807,108 | 2/1989 | Ben-Arieh et al. | 364/148 |
| 4,896,269 | 1/1990 | Tong | 364/468 |
| 5,121,330 | 6/1992 | Blaha et al. | 364/468 |

OTHER PUBLICATIONS

Chapman, "Manufacturing Control and Capacity Planning"; 1987 Proceedings, International Electronic Manufacturing Technology Symposium, IEEE Catalog Number 87CH2483-6, Library of Congress Number 87-81510.

Chapman, "Knowledge Acquisition of Manufacturing Descriptions", 1988 Proceedings, International Electronic Manufacturing Technology Symposium, IEEE Catalog Number 88CH2648-4.

Primary Examiner—Roy N. Envall, Jr.
Assistant Examiner—Laura Brutman
Attorney, Agent, or Firm—Joe E. Barbee

[57] ABSTRACT

A system and process for allowing virtual allocations of resources to lots to closely mimic actual allocations of resources to lots is disclosed. Virtual allocations represent planned or scheduled allocations of an organization's resources to produce various products. Actual allocations represent the actual course of events which occur while the product is being manufactured. A manufacturing interpreter interactively functions with an expert in a manufacturing environment to produce a comprehensive and accurate definition of resources utilized in a manufacturing environment. The manufacturing interpreter further allows the expert to define a comprehensive and accurate process flow description for various products. The process flow description specifies the resources, resource attribute capabilities, and order for applying resources to a single lot to produce a completed product. A planner operates upon this process flow data to generate a processing plan that is specifically adapted for the organization at a particular point in time, and an execution controller utilizes the processing plan to control the manufacturing of products within the manufacturing environment. Operation of the execution controller keeps allocation data current. Thus, the planner has current allocation data with which to merge process flow data for new products.

20 Claims, 11 Drawing Sheets

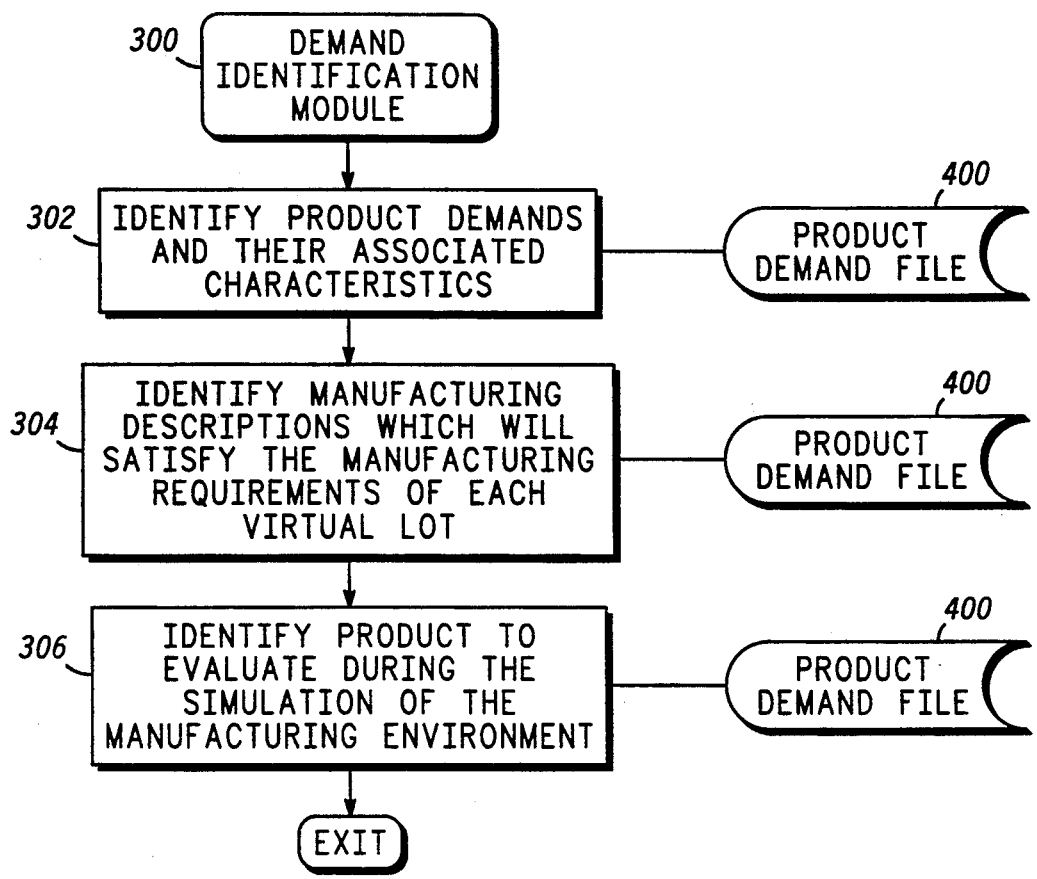
FIG. 3
FIG. 4
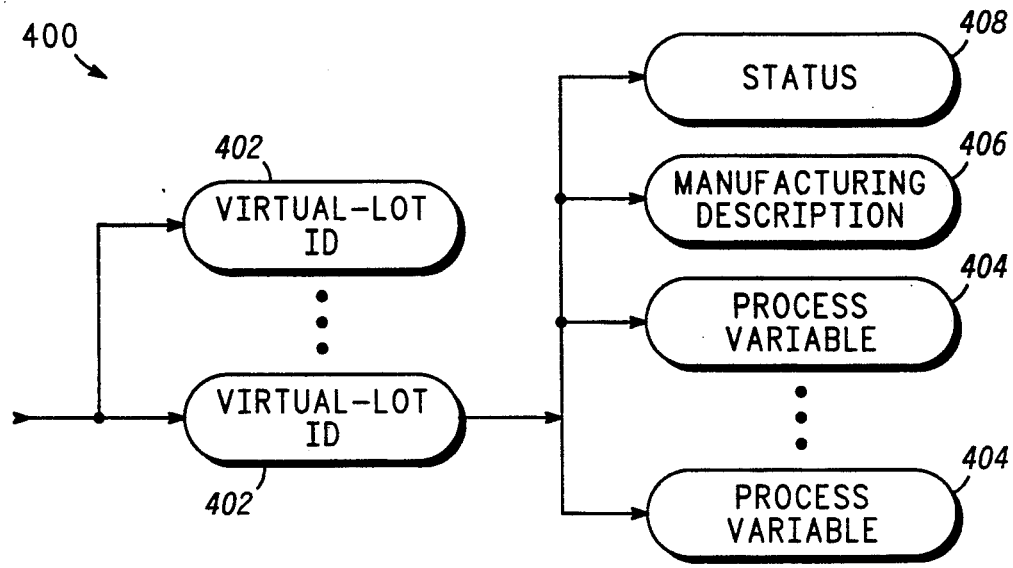

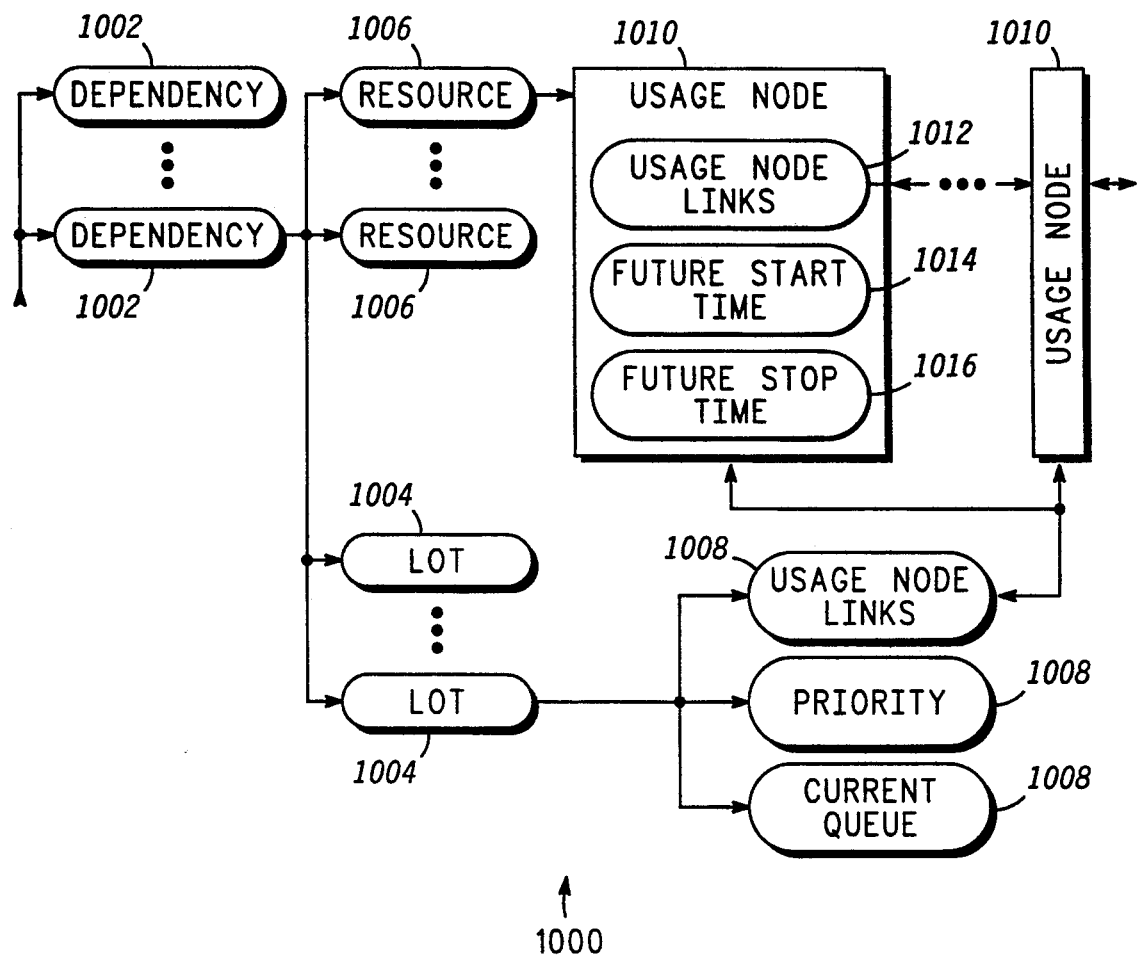
FIG. 10
FIG. 11
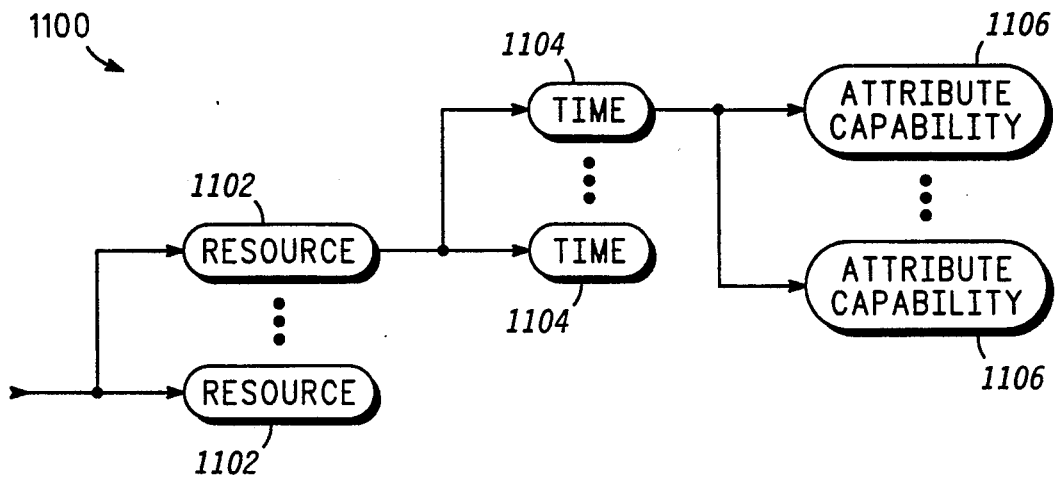

MANUFACTURING CONTROL AND CAPACITY PLANNING SYSTEM

RELATED INVENTIONS

The present invention is related to the following, all of which are assigned to the assignee of the present invention:

1. U.S. Patent Application Serial No. 07/342,774, filed Apr. 25, 1989, now U.S. Pat. No. 5,128,860 entitled "Means and Method for Managing Manufacturing or Other Resources," by William M. Chapman.
2. U.S. patent application Ser. No. 07/531,821, entitled "Method of Controlling the Execution of Organizational Plans," filed on even date herewith, by William M. Chapman, et al.
3. U.S. patent application Ser. No. 07/531,818, entitled "Resource-Lot Association Coordinator," filed on even date herewith, by William M. Chapman, et al.
4. U.S. patent application Ser. No. 07/532,310, entitled "Process Flow Information Management System," filed on even date herewith, by William M. Chapman, et al.
5. U.S. patent application Ser. No. 07/532,306, entitled "Method of Planning Organizational Activities," filed on even date herewith, by William M. Chapman, et al.

Each of the above-listed applications is incorporated herein by reference.

BACKGROUND OF THE INVENTION

Technical Field

The present invention relates generally to manufacturing and other organizational activities in which a multiplicity of tasks are simultaneously balanced against one another to achieve goals of the organization. More specifically, the present invention relates to a system for controlling the allocation of resources to lots both during planning stages and during actual manufacturing to optimize organizational efficiency.

Background Art

A manufacturer who applies a variety of resources to produce a variety of products must make judgments concerning a "best" allocation of resources to products. A best allocation is evaluated in light of the manufacturer's goals. For example, one product lot may be given priority over other product lots because it has a tight schedule or it may be behind in its schedule. Thus, such a high priority lot is favored in allocating resources. Alternatively, a manufacturer may wish to utilize one resource as efficiently as possible to minimize costs. Labor or an exceptionally expensive piece of equipment may be allocated to product lots in a manner which causes these resources to stay busy at a maximum capacity. Judgments must occur to balance one lot's demand for resources against another lot's demand, to balance a desire to expedite a lot against the desire to efficiently use certain resources, and to balance any single lot's demands for resources against overall organizational goals.

In a typical organization, allocation of resources to lots occurs in two "arenas." The first arena is that of "virtual" allocations. Virtual allocations are the result of using planning and scheduling tools and techniques. Critical Path Method (CPM), Project Evaluation and Review Technique (PERT), and Material Requirements Planning (MRP) represent a few of the conventional planning techniques. In a virtual allocation, no resources are actually used or managed in connection with processing a lot. Rather, information is organized and recorded to describe an intention, plan, or schedule to use various resources in connection with the processing of various lots. Typically, these virtual allocations describe future anticipated activities of the organization.

In contrast to virtual allocations, organizations also perform "actual" allocations of resources to lots. Actual allocations occur when an organization uses resources in connection with the processing of real lots. Of necessity, actual allocations relate to present and past activities of the organization. While virtual allocations are merely informational tasks, actual allocations result from ongoing organizational activities. In addition, an actual allocation may correspond to an informational task which records or otherwise describes actual allocations.

At best, an organization might expect or hope that its actual allocations will mimic its conventionally achieved virtual allocations. However, prior art manufacturing and planning systems fall far short of being able to suggest an optimal virtual allocation of product demands with resources. Moreover, conventional techniques fail to provide a system for making actual allocations follow virtual allocations. Consequently, actually achieving an optimal allocation is nearly impossible using conventional techniques.

One explanation for the problems of prior art systems is that virtual allocations generated by such systems are often unrealistic. For example, such conventional systems typically generate virtual allocations based on an assumption that all resources, whether labor or equipment, are treated the same when they are actually allocated. In reality, manufacturers often treat different resources differently. Thus, plans made using such conventional systems are flawed from the outset, and actual allocations tend to differ markedly from the virtual allocations.

Moreover, such conventional systems typically operate by traversing backward in time. In other words, a desired output time, or deadline, for a product lot is supplied to the system, and the system works backward in time from this deadline to determine when various processes need to be started and completed in order to meet the deadline. Unrealistic plans often result because the system focuses on processes needed to accomplish deadlines more than on resources practically available for allocation or on whether a desired deadline is realistic. Consequently, such virtual allocations are expected to describe only that which must happen in the organization and not that which will actually happen. When an organization actually allocates its resources, often the actual allocation fails to closely resemble the virtual allocation.

An organization would receive substantial benefits if it could make virtual allocations which could be closely mimicked by actual allocations. Specifically, such mimicry would permit optimized organizational efficiency. Accurate virtual allocation would permit improved use of resources. For example, resources could be kept busy at optimal efficiencies for longer periods of time. Additionally, lots could be sized, designed, and otherwise managed for improved processing, given an organization's resources. Optimum balancing points in actual allocations could be more closely approached. Moreover, with close mimicry of actual allocations to virtual allocations, an organization could improve prediction for completion of its lots. Any one of these benefits would lead to an improved competitive position for the organization.

SUMMARY OF THE INVENTION

Accordingly, it is an advantage of the present invention that an improved system and method for virtually and actually allocating resources to lots within an organization so that actual allocations may closely mimic virtual allocations is provided.

Another advantage of the present invention is that current and comprehensive information concerning actual allocations is maintained for use in making virtual allocations.

Still another advantage of the present invention is that virtual allocations based on current and comprehensive data are directly used to control execution of actual allocations.

Yet another advantage is that the present invention provides a system for feeding back information concerning actual allocations to improve accuracy of future virtual allocations.

Still another advantage is that the present invention provides a controller which operates in real time to manage actual allocations so that the actual allocations closely mimic the virtual allocations.

Another advantage is that the present invention provides a system and method for determining resource-to-lot allocations which optimize organizational efficiency.

The present invention is described herein using a set of related concepts. Accordingly, TABLE I, presented below, provides a glossary of terms and phrases which are used in describing the present invention. For purposes of the present invention, the normal usage of these terms and phrases is to be augmented by the definitions listed in TABLE I.

TABLE I

Plan -- a scheme or program identifying future processes to be performed on a lot in order to accomplish organizational goals. The processes specify the use of various resources in operating on the lot. The plan is expressed as an ordered collection of data retained in a media, such as a computer memory, from which it can be later accessed and transferred.

Process -- one step in a plan. A process identifies an activity or group of activities which are performed on a lot. A lot may wait during a process before the activity is actually performed. While waiting, a resource or many resources may be consumed, an event which denotes an initial use of the resource. After completion of the activity, previously consumed resources may be released, an event which denotes the final use of the resource.

Lot -- generally a tangible item or group of like tangible items toward which a plan's goal is directed. When a lot includes multiple items, all items of the lot are generally processed or operated upon as a unit. For example, a lot may be considered as a product, portion of a product, or other work in process within a manufacturing environment. In addition, a lot may be a dummy, phantom, or otherwise intangible logical need. Thus, an intangible lot may be scheduled to utilize a resource so that the resource's maintenance needs can be met.

Actual Lot -- a lot which is then-currently progressing through a manufacturing environment with an aim of being completed.

Virtual Lot -- an informational entity which describes a lot that has been identified for scheduling or planning purposes.

Resource -- a valuable commodity used or partially used in accomplishing an organization's goals for a lot. A resource may be a service, such as human labor, or a tangible item, such as tools, equipment, transportation systems, and raw materials. In addition, a dummy, phantom, or otherwise intangible resource may be TABLE I-continued created with attributes that affect a lot parameter. For example, an intangible resource may be created with a capability for processing a maximum quantity of product. Thus, such a resource can operate to limit maximum lot size in the manufacturing environment.

Attributes -- parameters which define a specific configuration or quality of a resource. For example, an attribute of an oven may be temperature, and an attribute of a mixer may be a speed at which the mixer operates. If two lots require different attribute capabilities of an otherwise sharable resource, the sharable resource may not be shared by the two lots.

Capability -- a value assigned to an attribute to describe a quantity or character exhibited by or required of a resource in a specific situation. If a resource attribute is temperature, a capability of the temperature attribute is a specific number of degrees. Likewise, if an attribute of a consumable inventory item, such as bolts, is quantity, then a specific number of bolts is a capability.

Static Resource -- a resource which is allocated to lots in a priority order without regard for whether the resource and lower priority lots remain idle while a higher priority lot completes a prior process or waits in a static wait queue for additional resources to become available. The commitment of a static resource to a lot prevents competing lots from having access to the resource. Raw materials and equipment are typically, although not necessarily, classified as static resources.

Dynamic Resource -- a resource which is allocated to any waiting lot when the resource becomes available. When more than one lot is waiting, a priority order determines to which lot the dynamic resource is assigned. In allocating a dynamic resource, a higher priority lot will wait for a lower priority lot to finish with the resource when: 1) the lower priority lot is waiting on the dynamic resource as the dynamic resource becomes available, and 2) the higher priority lot is not yet ready to use the dynamic resource when the dynamic resource becomes available. Labor is typically, although not necessarily, considered to be a dynamic resource.

Queue -- a sub-component of a process. In order for a lot to undergo a process, it must traverse at least one activity queue. In addition, it may traverse through a static wait queue and/or a dynamic wait queue.

Dynamic Wait Queue -- a simulated queue where a lot waits for the availability of a dynamic resource. While waiting, no activity is performed with or on the lot. Dynamic resources are consumed during dynamic wait queues. The queue ends when all dynamic resources consumed in the queue become available.

Static Wait Queue -- a simulated queue where a lot waits for the availability of a static resource. While waiting, no activity is performed with or on the lot. Static resources are consumed during static wait queues. The queue ends when all static resources consumed in the queue become available.

Activity Queue -- a simulated queue where a resource actually performs a service for, an activity with, or operates upon a lot. A resource is released at the end of an activity queue, when all activities requiring the resource have been performed.

Dependency -- a relationship which exists between various lots and resources. Lots which have a demand for a common resource share a single dependency with each other and the common resource. Likewise, two resources, each of which are demanded by a common lot, share a single dependency with one another and the common lot. Furthermore, lots and resources may indirectly share a dependency through other resources and lots, respectively. Generally speaking, as a given number of lots and resources become more dependent upon one another, the number of dependencies decreases. However, static and dynamic resources are defined so that they do not share a dependency through any common lots which may demand both resources.

Consume -- to simulate initial dedication of a resource or portion of a resource for use in connection with the processing of one or more lots. The resource portions consumed during a process cannot be used in connection with other lots until they are later released. Some resources, such as raw materials, need never be released and therefore may never be usable in connection with other lots.

Release -- to simulate the giving up of a resource or portion of a resource previously consumed. Resources are released only during an activity queue. Once released, a resource may subsequently be consumed by another lot or by the releasing lot in a later-occurring wait queue. For example, when a mixer has finished mixing a lot, the mixer is released. Thereafter, the mixer may be used with other lots.

TABLE I-continued

Use -- to simulate the benefit or service of a resource. A resource is consumed during a wait queue in the process where it is initially used. The resource is released at the end of an activity queue in the process where it is finally used. Thus, a static resource is used continuously from its consumption queue through its release queue while a fragmentable resource may be use intermittently between its consumption queue and its release queue.

Mortgage -- to dedicate, promise, pledge, or commit to allocating a resource or a portion of a resource at a specified time in the future and for a specified duration in order to process a lot so that a plan's goal may be achieved. A commitment removes or reduces the resource's capability or availability for the specified future duration from further allocation.

Vector -- a representation of a resource's capability as a function of time. A vector is formed as an array of nodes. Each node includes a value describing a resource attribute's capability and a time value. The nodes are arranged by increasing time values. One node exists for each point in time at which an attribute's capability value changes. Vectors are described in more detail in the above-discussed "Means and Method for Managing Manufacturing or Other Resources" patent application.

The above and other advantages of the present invention are carried out in one form by an improved method of controlling the allocation of resources to lots in accordance with an organization's goals. In this method, a process flow description is defined for a virtual lot. The process flow description specifies resource capabilities and associates resources with one another in a specified order. The method additionally includes the association of portions of unmortgaged future resource capabilities with one another in accordance with corresponding ones of the resource capabilities from the process flow description. A processing plan results from this association. The defining and associating steps are repeated if this resulting processing plan does not satisfy the organization's goals. When a processing plan satisfies the organization's goals, the virtual lot is selected for processing within the organization as an actual lot. The future resource capabilities identified in the processing plan are then mortgaged, and continuously revised in response to actual events occurring within the organization.

The above and other advantages of the present invention are carried out in another form by an improved system for controlling the allocation of resources to lots in accordance with an organization's goals. The system includes first, second, third, and fourth memory structures. The first memory structure retains process flow description data associated with virtual lots. The process flow description data specify resources associated with one another in a specified order for each of the virtual lots and capabilities required of the resources by each virtual lot. The second memory structure retains data describing future mortgaged capabilities of these resources. The system additionally includes a device for associating, for a specified one of the virtual lots, portions of unmortgaged future resource capabilities with one another in accordance with corresponding ones of the resource capabilities of the process flow description. As a result of this association, this device generates a processing plan. The third memory structure retains data describing the processing plan. The fourth memory structure retains data describing future allocations of resources to actual lots. The system additionally includes a device for converting the virtual lot into an actual lot and for controlling the execution of the processing plan to bring the actual lot to completion.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 3 shows a flow chart of a demand identification module of the present invention;

FIG. 4 shows a block diagram of a product demand file memory structure portion of the present invention;

FIG. 10 shows a block diagram of a dependency memory structure portion of the present invention;

FIG. 11 shows a block diagram of a vector information memory structure portion of the present invention;

DETAILED DESCRIPTION OF THE PREFERRED EMBODIMENT

Figure 1:
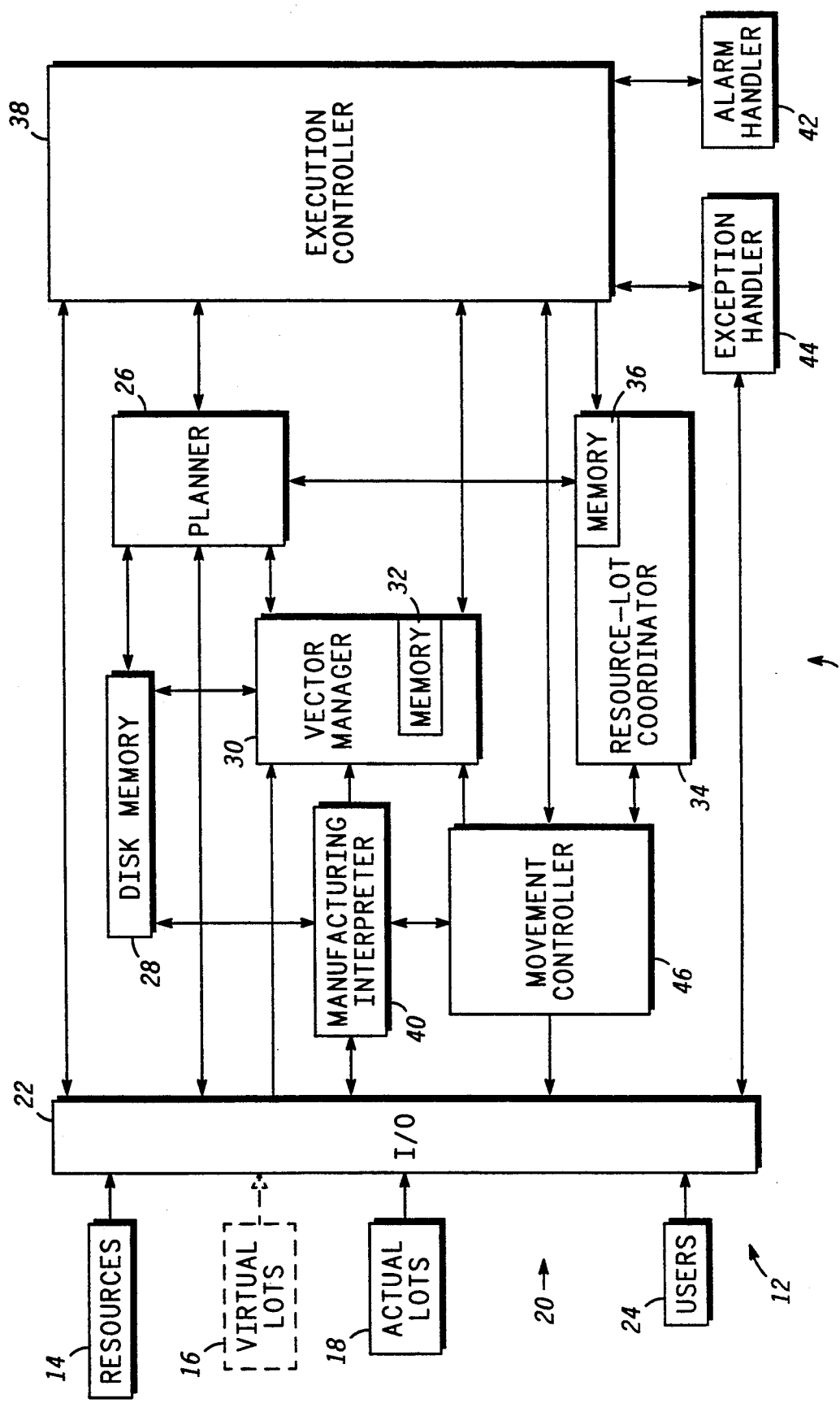
FIG. 1 shows a block diagram of a manufacturing environment in which the present invention operates.

FIG. 1 shows a block diagram of a manufacturing environment 10 in which a manufacturing control and capacity planning (MCCP) system 12 of the present invention operates. Generally speaking, the present invention is concerned with allocating resources 14 (see TABLE I) to virtual lots 16 (see TABLE I) and to actual lots 18. In addition, the present invention is concerned with the coordination of virtual allocations with actual allocations, and vice-versa. The present invention contemplates that MCCP system 12 can operate in connection with any number of resources 14 and any number of lots 16-18. However, as a practical matter the benefits obtained from utilizing MCCP system 12 are expected to increase as the complexity of environment 10 increases. For example, MCCP system 12 is expected to serve an extremely beneficial role when environment 10 includes thousands of resources 14 and hundreds of lots 16-18.

MCCP system 12 is implemented using conventional computer hardware 20. MCCP system 12 is preferably implemented within a conventional distributed computer network, but the present invention also contemplates the use of a single conventional computer. Within a distributed computer system, computer 20 may distribute the processing requirements of the separate components (discussed below) of MCCP system 12 away from one another so that these separate components can simultaneously operate while communicating with one another through messages. The distribution of computing tasks improves the timeliness of information processing by allowing each component to perform its functions in parallel with the operation of the other components of computer 20.

An input/output (I/O) section 22 of computer 20 provides conventional devices for interfacing computer 20 to the physical world. Thus, section 22 includes conventional printers, video terminals, light pens, and other information-passing devices. MCCP system 12 uses section 22 to provide information to human agents or users 24 of environment 10 so that they may identify, define, and manipulate virtual lots 16 and resources 14 and so that they may cause actual lots 18 to be processed in accordance with the information. Furthermore, I/O section 22 may include sensors, controllers, robots, and the like, which allow a direct automated interface between MCCP system 12 on one side and resources 14 and actual lots 18 on the other, without the intervention of users 24.

A planner component 26 of MCCP system 12 couples to I/O section 22 and aids an expert user 24 in formulating a plan for manufacturing a virtual lot 16. An expert is any person who is familiar with the processes and resources needed to transform the virtual lot 16, after conversion into an actual lot 18, into a finished product. Each manufacturing environment 10 and product will have a unique plan for transforming its virtual lots 16 into finished products.

Generally speaking, a plan specifies a series of processes (see TABLE I) which must be performed in order to transform a virtual lot 16 into a finished product. In addition, the plan specifies those ones of resources 14 which are needed to carry out the plan and tentative timing data which define when specific processes should take place. At the planning stage, a virtual lot 16 is merely planned and not activated as one of actual lots 18 in environment 10. In other words, a plan for producing a lot may have been made, but no work in progress has been started to accomplish the plan. The plan is retained in a disk memory 28, or other type of mass storage memory device, which couples to planner 26. Planner 26 is discussed below in connection with FIGS. 9-12 and in the above-discussed "Method of Planning Organizational Activities" patent reference.

A vector manager 30, which includes a relatively fast access, read/write memory 32, such as conventional RAM memory, couples to planner 26, disk memory 28, and to I/O section 22. Vector manager 30 operates in real time to specify, maintain, and otherwise control the mortgaging (see TABLE I) of future resource capabilities for use with actual lots 18. Vectors (see TABLE I) and vector manager 30 are described in more detail below in connection with FIG. 10 and in the above-discussed "Means and Method for Managing Manufacturing or Other Resources" patent reference.

A resource-lot coordinator 34, which includes a relatively fast access, read/write memory 36, such as conventional RAM memory, couples to vector manager 30 and to planner 26. Coordinator 34 operates in real time to maintain a dependency memory structure within memory 36 that informationally links resources 14 with actual lots 18. Thus, coordinator 34 records and manages the virtual allocations of resources 14 to actual lots 18. This managing of virtual allocations includes keeping track of all timing data needed to characterize the virtual allocations. In addition, coordinator 34 is configured to identify dependencies (see TABLE I) resulting from these allocations, and to organize the allocations accordingly. Coordinator 34 is discussed in more detail below in connection with FIGS. 9, 11, and 13 and in the above-discussed "Resource-Lot Association Coordinator" patent reference.

An execution controller 38 simulates the operation of environment 10 based on information maintained by vector manager 30 and coordinator 34. On the basis of these simulations, plans are cooperatively controlled in real time to optimize actual resource-lot allocations in environment 10. Controller 38 uses a plan as a baseline for desired organizational performance, and continually manipulates virtual allocations in response to deviations in the plans so that actual manufacturing execution will closely mimic the original plans or organizational goals upon which the original plans were based. Execution controller 38 is described in more detail below in connection with FIG. 13 and in the above-discussed patent reference entitled "Method of Controlling the Execution of Organizational Plans."

A manufacturing interpreter 40 couples to I/O section 22, vector manager 30, and disk memory 28. Vector manager 30 initializes its internal knowledge with information provided through manufacturing interpreter 40. Manufacturing interpreter 40 translates data descriptive of a specific environment 10 and specific resources 14 therein into a generic form, which is compatible with the components of computer 20. This translation occurs interactively with input from an expert user 24. Manufacturing interpreter 40 is discussed in more detail below in connection with FIGS. 5-8 and in the above-discussed "Process Flow Information Management System" patent reference.

An alarm handler 42 provides a timing function for execution controller 38. This timing function instructs execution controller 38 to reassess simulations of environment 10 or to automatically cause specified ones of actual lots 18 to move based on the lot's plan. An exception handler 44 evaluates deviations identified by execution controller 38 during simulations of environment 10 or by user 24 or another external source through I/O section 22. The evaluation is customized for particular environments 10 by an expert user 24. After evaluation, a resolution of the deviation is returned to execution controller 38 for continued simulation and control of those actual lots 18 and resources 14 for which deviations were indicated.

A movement controller 46 couples to I/O section 22, vector manager 30, coordinator 34, execution controller 38, and manufacturing interpreter 40. Movement controller 46 generally controls the movement of actual lots 18 within manufacturing environment 10. Initiating information which causes such movement may originate from execution controller 38. Appropriate movement instructions and movement feedback information are passed through I/O section 22 to control actual lots 18. In addition, this movement information and associated feedback may operate as the signaling events which cause MCCP system 12 to progress. For example, this movement information may serve as feedback information to manufacturing interpreter 40 to help improve process flow descriptions (discussed below in connection with FIGS. 7-8). Likewise, mortgage and allocation data managed in memories 32 and 36 may be updated as a result of such movement information, and future simulations may be initiated as a result of such movement information.

Figure 2:
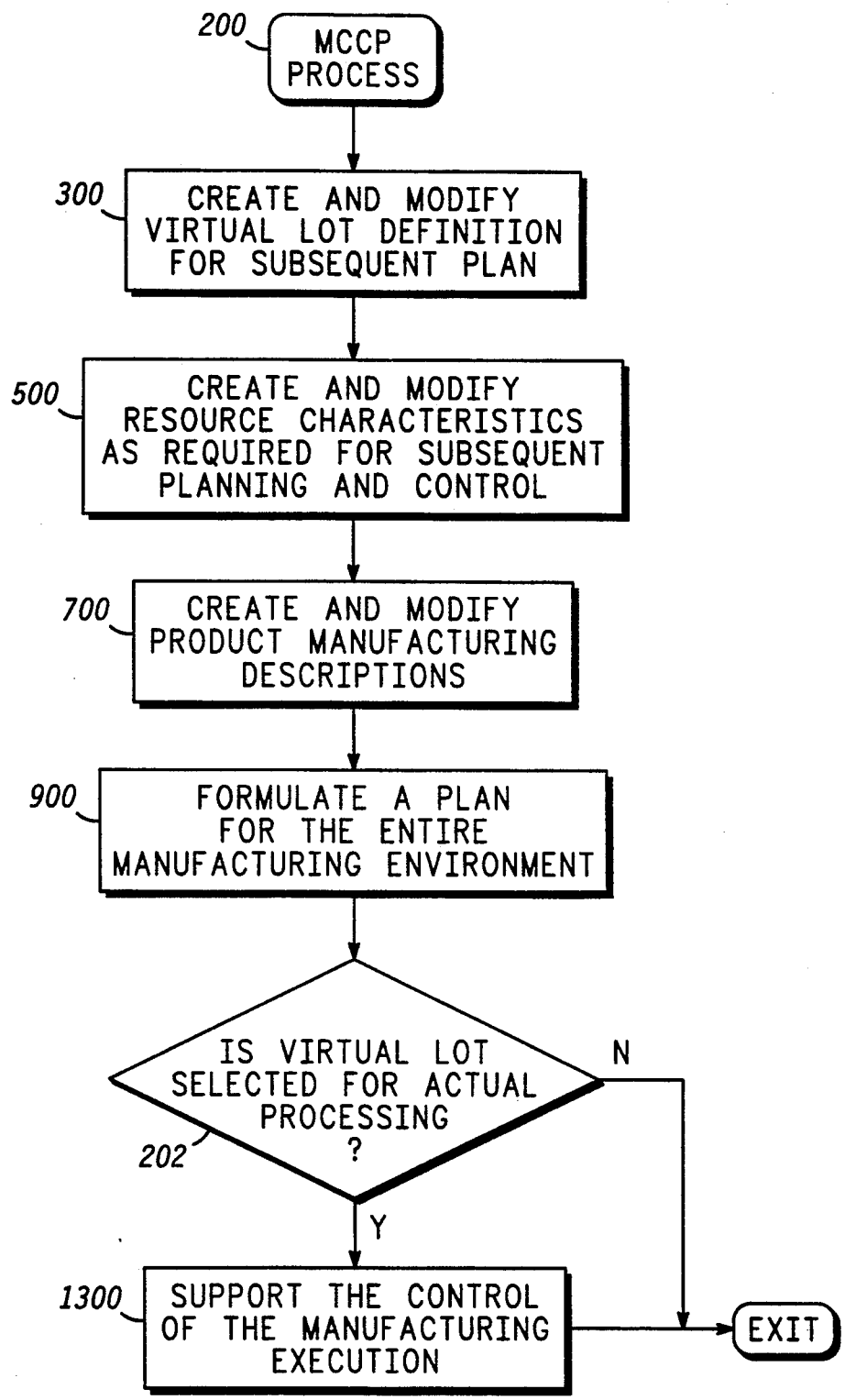
FIG. 2 shows a flow chart of modules performed by the present invention.

FIG. 2 shows a flow chart of an MCCP process 200 performed by MCCP system 12 within manufacturing environment 10. MCCP process 200 begins with the conception of a "target" virtual lot 16 and ends, with respect to that target lot, at the completion of a corresponding actual lot 18. However, in most circumstances MCCP process 200 operates on additional virtual and actual lots 16-18 simultaneously with its operation on the target virtual and actual lots 16-18. Thus, MCCP process 200 may operate continuously, and the various modules contained with MCCP process 200 may be activated in parallel with one another with respect to diverse lots 16-18.

A demand identification module 300 generally allows a user 24 to communicate information identifying a virtual lot 16 to MCCP process 200 through planner 26 (see FIG. 1). Each virtual lot 16 places its own set of demands on manufacturing environment 10, and module 300 allows a user 24 to identify the nature of these demands for subsequent planning. Demand identification module 300 is discussed below in connection with FIGS. 3-4.

A resource characterization module 500 generally allows a user to communicate information identifying and characterizing resources 14 to MCCP process 200 through manufacturing interpreter 40 (see FIG. 1). Each of the virtual lots 16 identified in demand identification module 300 requires the use of various ones of resources 14. Resource characterization module 500 allows a user 24 to identify these resources and specify relevant characteristics of the identified resources. Resource characterization module 500 is discussed below in connection with FIGS. 5-6.

After resource characterization module 500 has been invoked to identify and characterize resources 14, a manufacturing description module 700 is performed through manufacturing interpreter 40 (see FIG. 1). Module 700 allows a user to communicate information specifying specific discrete processes which a virtual lot 16 must undergo in order, after being converted into an actual lot 18, to be processed to completion. In other words, a manufacturing description may be viewed as defining a specific job which consists of an ordered sequence of processes. At the level of manufacturing description module 700, each job definition is generated in isolation of all other jobs performed or potentially performable within manufacturing environment 10. Thus, each job definition contains no information related to sharing or allocating resources between other jobs. Manufacturing description module 700 is discussed below in connection with FIGS. 7-8.

After the completion of modules 300 and 700, MCCP process 200 invokes a planning module 900. Module 900 is performed by planner 26 (see FIG. 1) and simulates the operation of manufacturing environment 10 to generate a processing plan. This processing plan resembles a schedule in which resources 14 are allocated to virtual lots 16. Moreover, the processing plan balances the demands of multiple virtual lots 16 with one another and with the demands of actual lots 18. Planning module 900 is discussed below in connection with FIGS. 9-12.

After module 900 formulates an acceptable plan, a task 202 converts the virtual lots 16 included in the processing plan, or portions of these virtual lots 16, into actual lots 18. Task 202, which is performed by planner 26 (see FIG. 1) may represent nothing more than a selection of virtual lots 16 for actual processing in manufacturing environment 10 by a user 24. These selections is an informational task. Consequently, nothing happens within manufacturing environment 10 upon the initial conversion of a virtual lot 16 into an corresponding actual lot 18. Rather, this information is passed from planner 26 to vector manager 30, resource-lot coordinator 34 and execution controller 38 to update memory structures which contain data related to actual lots 18.

After these memory structures have been updated in task 202, an execution control module 1300 is invoked to control the actual implementation of the processing plan within manufacturing environment 10. Module 1300 is performed by execution controller 38 (see FIG. 1) in conjunction with movement controller 46. Module 1300 operates in real time as actual lots 18 are being processed. As events within manufacturing environment 10 occur, information describing actual allocations is generated. Additionally, as these events occur, plans concerning actual lots 18 change in response to these actual events. Module 1300 continuously generates current information describing virtual allocations of resources 14 to actual lots 18 in response to these changes. Module 1300 controls manufacturing execution of a target actual lot 18 until the target actual lot 18 is completed. At this point, a job or product may be finished and ready for transfer out of manufacturing environment 10. Alternately, a product may then be re-introduced into manufacturing environment 10 for incorporation into other lots. Execution control module 1300 is discussed below in connection with FIG. 13.

FIG. 3 shows a flow chart of demand identification module 300. As discussed above, planner 26 performs module 300 in an interactive session with user 24 (see FIG. 1). Generally speaking, module 300 collects information concerning virtual lots 16, and may be performed using conventional database manipulation techniques. In a task 302, planner 26 prompts user 24 to identify one or more virtual lots 16 and associated characteristics of the identified virtual lots 16. User 24 identifies a virtual lot 16 by supplying or giving the virtual lot 16 a name.

The characteristics which task 302 asks user 24 to supply define the demands to which manufacturing environment 10 must cater in order to produce a completed product. When virtual lot 16 represents a typical tangible product, such characteristics, or process variables, may include a quantity of the product and/or a priority to assign to the virtual lot 16.

Task 302 places the name and characteristic information gathered from user 24 into a product demand memory structure 400, which is maintained as a file in disk memory 28 (see FIG. 1). FIG. 4 shows a block diagram of a product demand memory structure 400. As shown in FIG. 4, structure 400 may contain any number of virtual lot identifiers 402, and each virtual lot identifier 402 has any number of process variables 404 associated with it.

Referring to both FIGS. 3 and 4, in a task 304 planner 26 prompts user 24 to supply a manufacturing description identifier 406. Generally speaking, a manufacturing description is a detailed definition of the specific processes needed to complete a job. However, in task 304 user 24 is not asked to make a manufacturing description. Rather, task 304 only requests a name of a manufacturing description. Thus, an existing manufacturing description may be identified by supplying its name in task 304. If a manufacturing description which will satisfy the manufacturing requirements of a virtual lot 16 does not exist, then a new manufacturing description may be named in task 304, and the actual manufacturing description will be generated through invoking manufacturing description module 700, discussed below in connection with FIGS. 7-8. Task 304 associates manufacturing description identifier 406 with its virtual lot 16 within product demand memory structure 400.

In a task 306, planner 26 prompts user 24 to define a status definition 408 for the virtual lots 16 identified in memory structure 400. The particular status item requested in task 306 defines whether to include the associated virtual lot 16 within a subsequent simulation of manufacturing environment 10. Thus, a user 24 may easily add and subtract virtual lots 16 to generate alternate plans. Task 306 associates status definition 408 with its corresponding virtual lot 16 within product demand memory structure 400.

Figure 5:
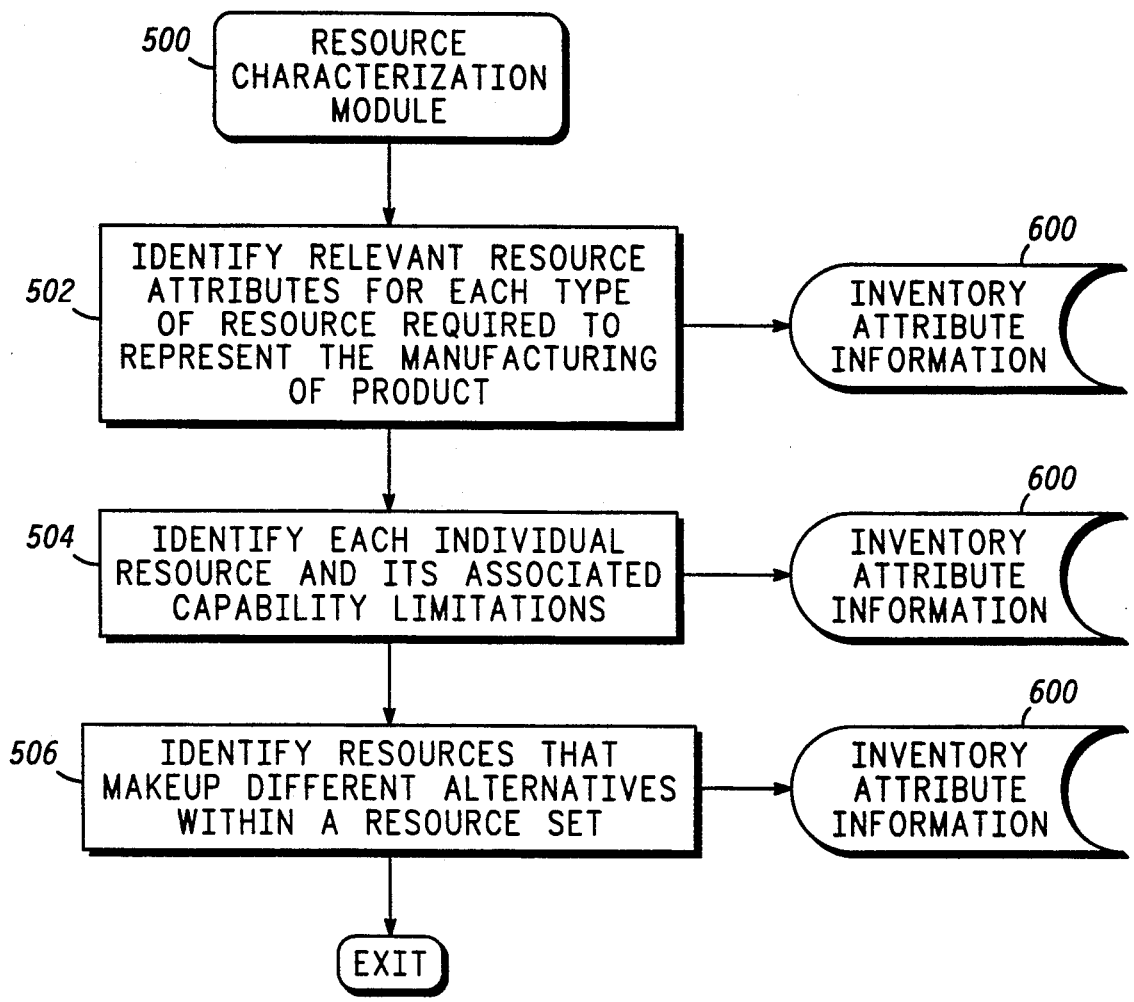
FIG. 5 shows a flow chart of a resource characterization module of the present invention.

Tasks 302-306 need not be performed in any particular order within demand identification module 300. After completion of tasks 302-306 product demand memory structure is sufficiently complete to permit the operation of planning module 900, discussed below in connection with FIG. 9. However, if manufacturing description identifier does not identify an existing manufacturing description, then modules 500 and 700 must be invoked in order to make the identified manufacturing description. FIG. 5 shows a flow chart of resource characterization module 500. As discussed above, manufacturing interpreter 40 performs module 500 in an interactive session with user 24 (see FIG. 1). Generally speaking, module 500 collects information concerning resources 14, and this collection may be performed using conventional database manipulation techniques. Module 500 is an optional module. MCCP process 200 performs module 500 only when prior-obtained information is not adequate for making future plans. For example, a virtual lot 16 to be included in future plans may require a resource 14 which has not been previously characterized for MCCP process 200. Alternatively, a virtual lot 16 to be included in future plans may require specification of resource attributes (see TABLE I) which have not been previously characterized for MCCP process 200. Accordingly, MCCP process 200 uses module 500 to obtain adequate information about resources 14.

In a task 502, manufacturing interpreter 40 prompts user 24 to identify relevant attributes for each of the resources that are needed in order to manufacture the virtual lots 16 to be included in a future plan. All attributes of these resources which are relevant to actual processing of each of the virtual lots 16 must be identified. Any number of attributes may be characterized as being relevant. As an example, relevant attributes of an oven may include temperature, number of shelves, temperature ramping rates, and the like. Generally speaking, the more comprehensive the description of relevant attributes the more accurate virtual allocations of resources to lots become, and the present invention does not limit the naming and description of resource attributes.

Preferably, irrelevant attributes are omitted simply because they unnecessarily consume memory space. An example of an irrelevant attribute for an oven might be the exterior color of the oven. However, it is user 24, who is an expert on manufacturing environment 10, that determines what an attribute is and whether or not a potential attribute is relevant. Furthermore, user 24 need not be extremely concerned about the difference between relevant and irrelevant attributes because identifying more attributes than may be currently relevant does not pose a serious problem.

Figure 6:
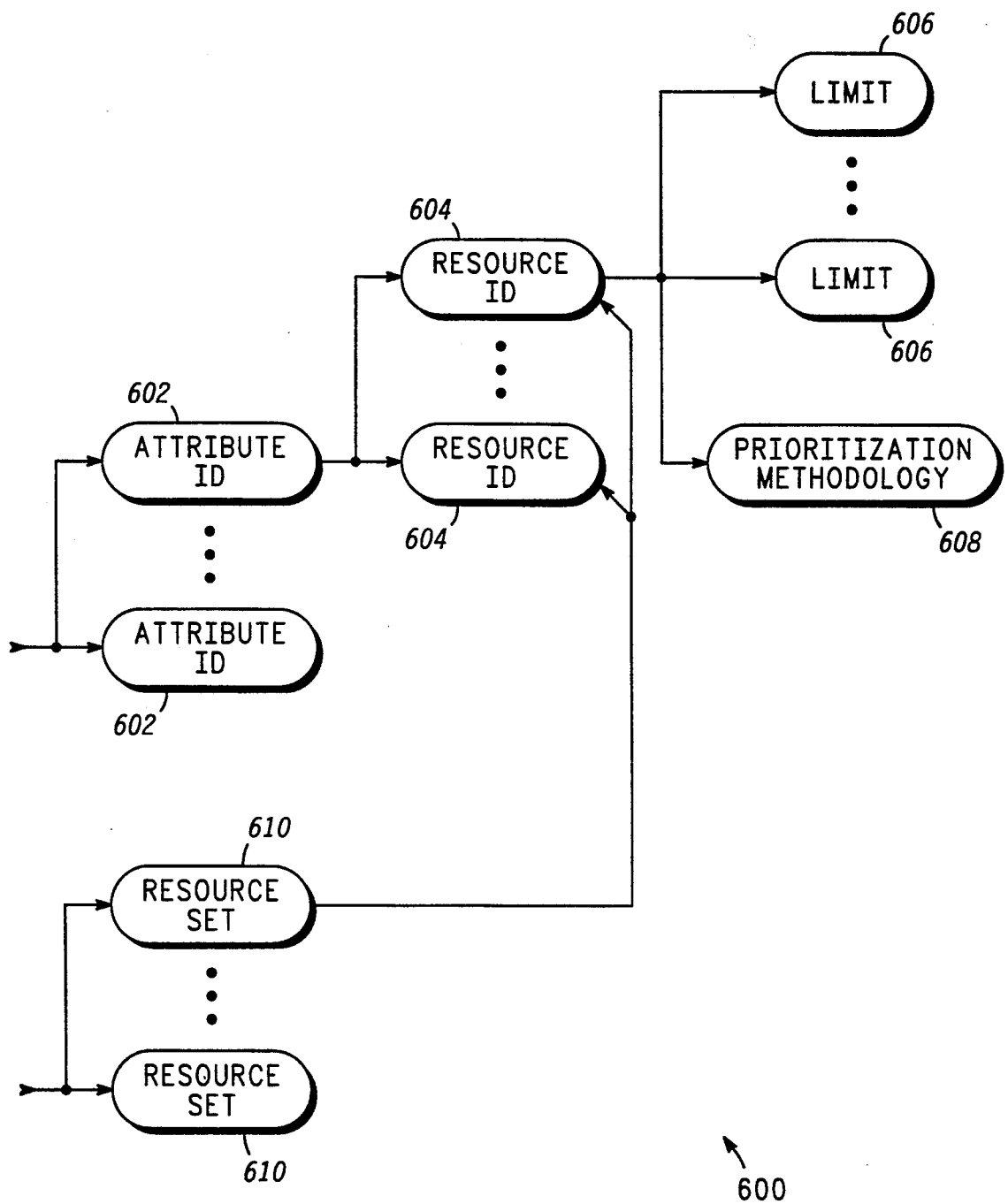
FIG. 6 shows a block diagram of an inventory attribute information memory structure portion of the present invention.

Task 502 places the attribute identification information gathered from user 24 into an inventory attribute information memory structure 600, which is maintained as a file in disk memory 28 (see FIG. 1). FIG. 6 shows a block diagram of inventory attribute information memory structure 600. As shown in FIG. 6, structure 600 may contain any number of attribute identifiers 602.

Referring to both of FIGS. 5 and 6, in a task 504 manufacturing interpreter 40 prompts user 24 to supply a resource identifier 604 for each resource 14, capability (see TABLE I) limits 606, and a prioritization methodology definition 608 for the identified resource 14. Task 504 transfers this information to memory structure 600. Resource identifier 604 represents a name of a specific resource 14. Capability limits 606 describe the maximum and minimum capacities or other boundaries on the capabilities of the corresponding resource 14. For example, capability limits of a temperature attribute of a specific oven resource 14 may be upper and lower temperatures. A capability limit of a quantity attribute of a consumable raw material, such as bolts or welding rods, may be the maximum inventory that can be held in a particular bin. Prioritization methodology 608 specifies whether to consider the corresponding resource 14 as being a static or dynamic resource (see TABLE I) in subsequent plans.

Memory structure 600 associates any number, typically one or two, of capability limits 606 with each resource id 604. In addition, capability limits 606 and their associated resource id 604 are associated with an attribute id 602. Thus, each attribute id 602 has its own structure of resource ids 604 and capability limits 606. Of course, the same resource id 604 may be associated with multiple attribute ids 602.

In a task 506, resource characterization module 500 prompts user 24 to identify resources 14 which are included in resource sets 610. Each resource 14 included within a resource set 610 may be substituted for another without a significant effect on the processing of product. For example, manufacturing environment 10 may include many push cart resources 14 for transporting work-in-progress from one location to another. All carts may be included in a single set. Thus, a particular manufacturing description, discussed below in connection with FIGS. 7-8, may specify use of a member of this set, and planner 26 and execution controller 38 (see FIG. 1) will have great flexibility in virtually and actually allocating all carts. In addition, all carts of a single size may be grouped in their own set. Thus, a manufacturing description may specify the use of a cart from the set of all carts, a cart from the set of carts of a specific size, or a specific single cart. Generally, a user 24 will wish to identify as broad a set as possible to satisfy a demand of a virtual lot 16. A more narrow specification of a resource than is necessary will unduly constrict potential plans and manufacturing control, and may lead to less efficient allocations of lots to resources.

As shown in FIGS. 5-6, task 506 saves resource set identifiers 610 in memory structure 600. Any number of sets may be identified, and each set identifier 610 is associated with its corresponding resources 604. Tasks 502-506 need not be performed in any particular order within resource characterization module 500. After completion of tasks 502-506 product demand memory structure 600 is sufficiently complete to permit the operation of manufacturing description module 700, discussed below in connection with FIGS. 7-8.

Figure 7:
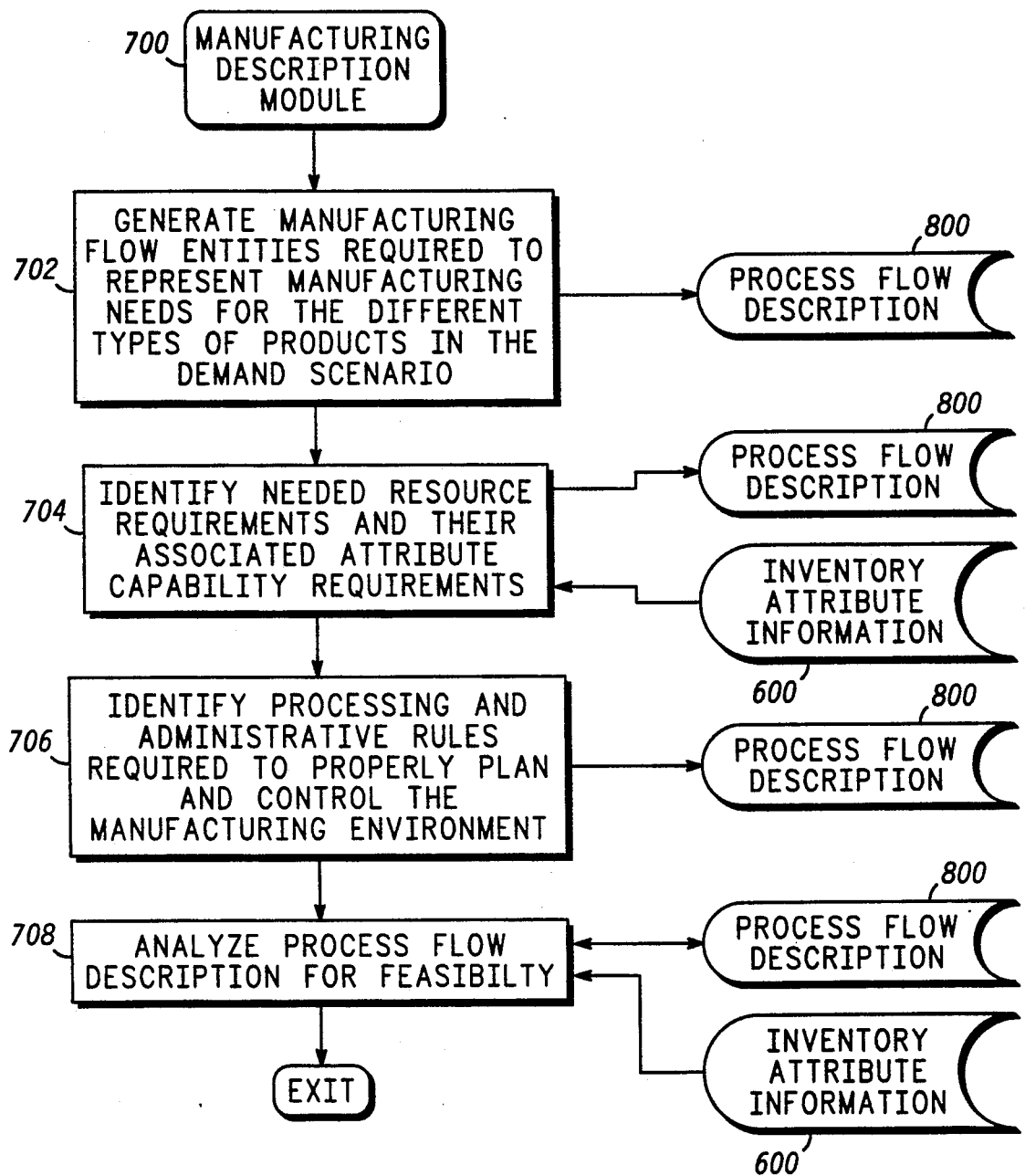
FIG. 7 shows a flow chart of a manufacturing description module of the present invention.

FIG. 7 shows a flow chart of manufacturing description module 700. As discussed above, manufacturing interpreter 40 performs module 700 in an interactive session with user 24 (see FIG. 1). Generally speaking, module 700 collects information concerning the specific processes required to accomplish a specific job. This collection task may be performed using conventional database manipulation techniques. In addition, module 700 performs some initial checking of a specified job to determine its feasibility. Such checking involves standard programming techniques like those employed in conventional assemblers, interpreters, and compilers. Like module 500, discussed above, module 700 is an optional module which MCCP process 200 needs to perform only when prior-obtained information is not adequate for making future plans. For example, a virtual lot 16 to be included in future plans may require a process flow description which has not been previously characterized for MCCP process 200.

Figure 8:
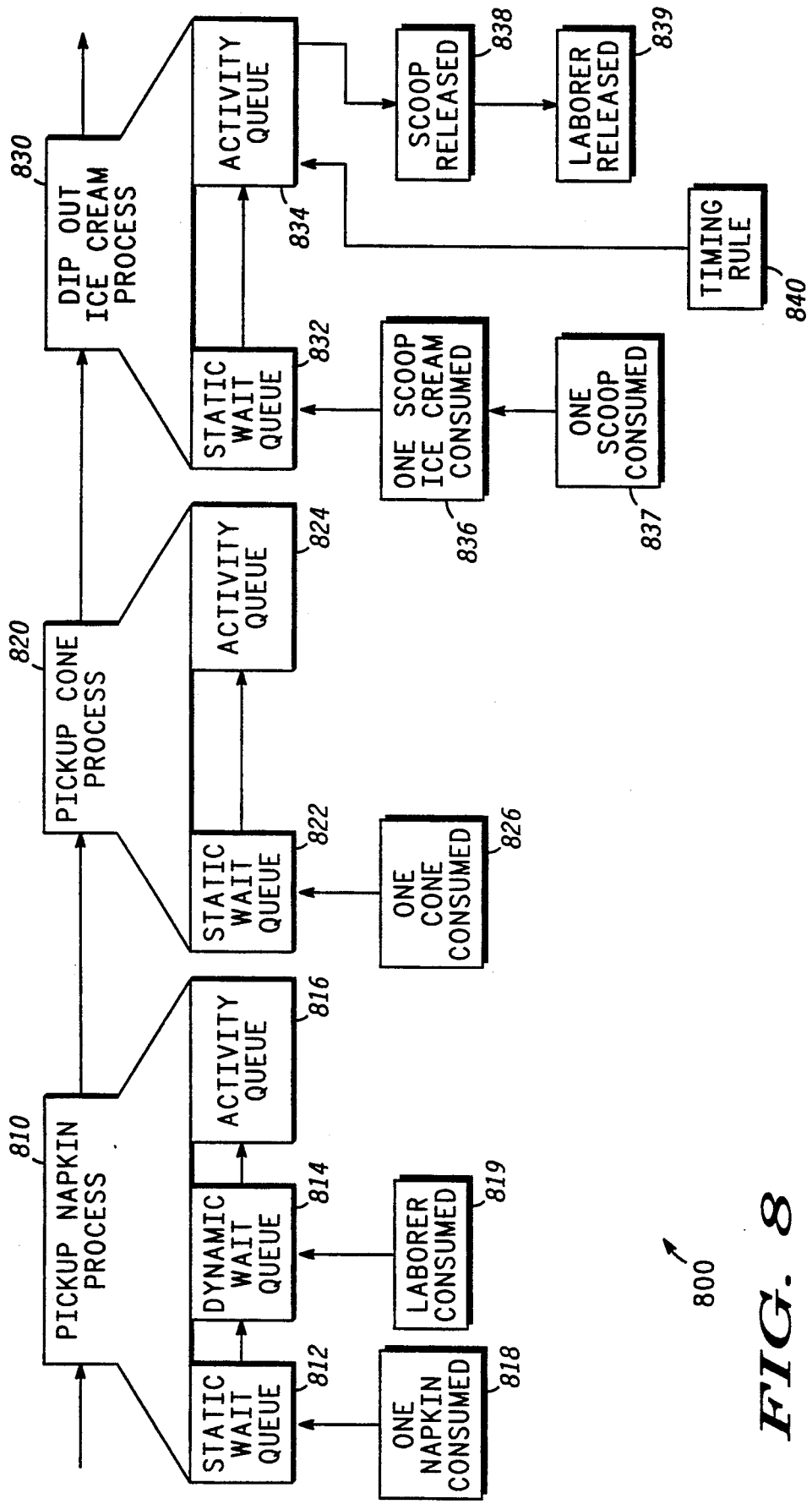
FIG. 8 shows a block diagram of a process flow description memory structure portion of the present invention.

In a task 702, manufacturing interpreter 40 allows a user 24 to identify the flow entities required to manufacture virtual lots 16. These flow entities represent the specific sequence of processes and queues (see TABLE I) which must be performed in order to complete a job. Task 702 stores this flow information in a process flow information memory structure 800, which is retained in disk memory 28 (see FIG. 1). FIG. 8 shows a block diagram of a process flow description which results from memory structure 800.

In order to simplify the concepts embodied in the present invention, FIG. 8 illustrates process flow description 800 with respect to the extremely simple, specific job of making a single, one-scoop, ice cream cone. Of course, MCCP process 200 (see FIG. 2) is not dedicated to any particular job but may be programmed with manufacturing requirements by users 24 for a wide variety of jobs, particularly jobs which may be many times more complicated than that shown in FIG. 8. In addition, environment 10 in which MCCP process 200 operates may simultaneously retain and operate upon a multiplicity of process flow descriptions 800 which are aimed toward achieving different goals in relation to a multiplicity of virtual lots 16.

Process flow description 800 of FIG. 8 is divided into three processes. A first process 810 of the FIG. 8 process flow description calls for picking up a napkin, a second process 820 calls for picking up a cone, and a third process 830 calls for scooping out ice cream and placing the ice cream in the cone. Of course, the present invention places no constraints on the number of processes that a process flow description may include. These processes are defined by an expert user 24 in accordance with the expert user's understanding of the processes needed to complete the job.

With reference back to FIG. 7, task 702 allows expert user 24 to specify the processes required by a specific job, and to sequence the processes as desired for the specific job. Next, a task 704 allows expert user 24 to specify the resource requirements at each process in the job, and to specify the needed resource attribute capabilities.

As shown in FIG. 8, task 704 allows expert user 24 to divide each of processes 810, 820, and 830 into one or more queues. The queues specified for each process are defined by the expert user 24 in accordance with his or her understanding of the processes. As shown in FIG. 8, each process contains at least an activity queue, defined above in TABLE I. In addition, each process may include one or more wait queues. In process 810 the expert has included a static wait queue 812, defined above in TABLE I, followed by a dynamic wait queue 814, defined above in TABLE I, followed by an activity queue 816. The expert has included only a static wait queue 822 followed by an activity queue 824 in process 820 and only a static wait queue 832 followed by an activity queue 834 in process 830.

As discussed above, MCCP process 200 bases plans upon whether various resources 14 are identified as being static or dynamic resources. As defined above in TABLE I, the difference between static and dynamic resources lies in the prioritization methodologies employed in allocating resources 14 to lots 16–18. The precise prioritization methodologies applied to specific resources are not important to the present invention. However, as a result of this permitted dichotomy in resource allocation, resource-lot allocation coordinator 34 (see FIG. 1) is able to maximize the number of dependencies (see TABLE I) within the data it processes. Consequently, computer 20 may simulate environment 10 in real time, and simulation results tend to realistically reflect environment 10.

Generally speaking, environment 10 uses dynamic resources 14 more efficiently than it uses static resources 14. In order to use dynamic resources efficiently, some of actual lots 18 may be processed less expeditiously than would result if the dynamic resources were treated as being static. United States manufacturers typically manage laborers so that they stay busy and do not wait around for lots 18 to become available for their services. As a result of this treatment, work in progress tends to wait on the availability of laborers rather than having labor wait until work in progress becomes available to receive the labor's services.

Static queues, such as queues 812, 822, and 832, represent periods of time for which a lot must wait for the availability of a static resource, and dynamic queues, such as queue 814, represent periods of time for which a lot must wait for the availability of a dynamic resource. As shown in connection with process 810, dynamic queue 814 is described as occurring after a static queue 812 since both types of wait queues are present within a single process 810. This relationship between static and dynamic queues should be chosen most often by the expert because it allows planning and simulation to treat dynamic resources as a more precious commodity which must be used as efficiently as possible.

As shown at element 818 in the example presented in FIG. 8, expert user 24 has classified a napkin as being required during process 810. This resource has previously been classified as a static resource (see FIG. 6), and that information is available to task 704 (see FIG. 7) from inventory attribute information memory structure 600. Due to this classification, the napkin must be available before a laborer picks up the napkin. Moreover, task 704 has specified that the capability requirement for the quantity attribute of the napkin resource 14 is one. Thus, task 704 identifies a single napkin as being consumed (see TABLE I) in static wait queue 812. For planning and simulation purposes, that portion of a resource which has been consumed by a lot is treated as being unavailable for allocation to another lot. In other words, the napkin consumed in queue 812 will not later be planned or simulated as being available for another lot.

The ice cream cone virtual lot 16 of process flow description 800 is described as remaining in dynamic wait queue 814 until a laborer becomes available, as indicated at element 819. Task 704 may further specify in element 819 that the capability requirement for a time attribute of the laborer resource 14 is a duration estimated to complete the laborer's task. The availability of a dynamic resource, such as a laborer, is projected during a simulation of environment 10 by considering other tasks to which the resource may be allocated. The simulation refrains from characterizing the dynamic resource as remaining idle while it waits on a lot to become available when other competing lots are already available. Once the laborer is available, process 810 flows into activity queue 816, in which the laborer actually picks up the napkin.

In other words, no activity is described as occurring in queue 812. Rather, the lot is described as waiting for the availability of a napkin. Likewise, no activity is described as occurring in queue 814. Rather, the lot is described as waiting for a laborer to become available to pick up the napkin. Only in activity queue 816 is activity simulated, and that activity is the picking up of the napkin.

Resources may be released (see TABLE I) at the completion of an activity queue. However, as shown in activity queue 816 of process 810, process flow description 800 is not required to release a resource as the result of an activity queue. When a previously consumed resource is not released, the lot which consumed it continues to use the resource for subsequent queues until process flow description 800 calls for releasing the resource. For example, the napkin is not released after queue 816. Thus, the napkin continues to be associated with the lot during simulation, and description 800 recognizes that the napkin is not available for use by another lot.

After completion of process 810, manufacturing flow in environment 10 is described as progressing into static wait queue 822 of process 820. Process 820 operates similarly to process 810, except that no dynamic wait queue is included. The dynamic wait queue may be omitted because the dynamic resource (i.e. laborer) has not been released and is still allocated to this lot. In addition, at an element 826, task 704 allows expert user 24 to specify that a static resource of an ice cream cone is to be consumed at static wait queue 822 of process 820. Furthermore, element 826 may specify a capability of one for the quantity attribute of the cone static resource 14. When the cone becomes available, manufacturing flow proceeds to activity queue 824 of process 820. In activity queue 824, the laborer picks up the cone.

After completion of activity queue 824, manufacturing flow proceeds to static wait queue 832 of process 830. Elements 836 and 837 specify that, in this static wait queue, a static resource of a single scoop of ice cream is consumed, and a static resource of a single scooping implement is consumed, respectively. If process flow description 800 called for production of a two-scoop ice cream cone rather than a one-scoop ice cream cone, then element 836 would specify a capability requirement of two scoops for the quantity attribute of the ice cream static resource 14. As discussed above, manufacturing flow progresses out of static wait queue 832 into activity queue 834 only after these static resources become available. Elements 838 and 839 specify that, in activity queue 834, the laborer actually scoops the ice cream and places the ice cream in the cone.

According to elements 838-839, at the completion of activity queue 834, the scooping implement and laborer are released. After release, the simulations of environment 10 may reflect the allocation of these released resources to other lots as needed.

With reference to FIGS. 7-8, a task 706 allows expert user 24 to identify any processing or administrative rules which further define proper planning and control of the manufacturing environment 10. Task 706 allows a rule to be identified and linked to an appropriate point in process flow description 800. For example, an element 840 represents a rule related to timing in the above-discussed production of an ice cream cone. Element 840 is linked to activity queue 834 and identifies a rule that requires, for example, the completion of activity queue 834 within a predetermined duration after starting activity queue 816. With this rule, the job defined by process flow description 800 will not be planned or simulated as starting unless other commitments for the resources 14 used by this job allow it to be completed within the predetermined duration.

After completion of tasks 702-706, a task 708 analyzes the process flow description 800 generated in tasks 702-706 for feasibility of planning and manufacturing control. Task 708 searches for certain logic and syntactical errors in process flow description 800. For example, a resource, resource attribute, or resource attribute capability may be specified which is not compatible with information contained in inventory attribute information memory structure 600. Alternatively, a timing rule may be incompatible with timing capability requirements of specified resources. Further, process flow description 800 may not properly link processes together so that infinite processing loops exist or so that processes are specified which are never executed. Task 708 identifies such incompatibilities and others so that expert user 24 can take appropriate action. When task 708 indicates that a manufacturing network defined by process flow description 800 is feasible, MCCP process 200 (see FIG. 2) may progress to planning module 900.

Figure 9:
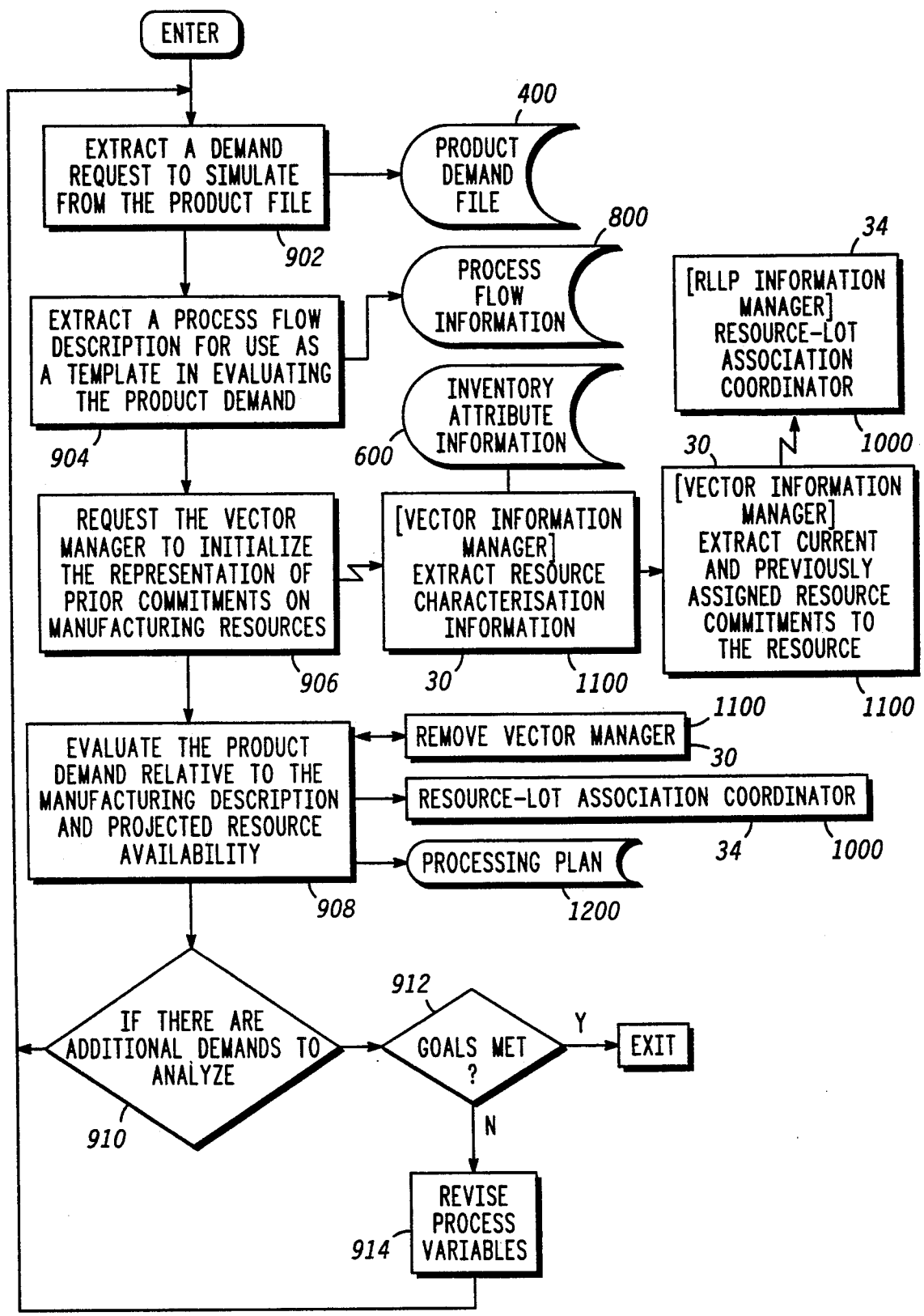
FIG. 9 shows a flow chart of a planning module of the present invention.

FIG. 9 shows a flow chart of planning module 900. As discussed above, planner 26 (see FIG. 1) performs module 900. Generally speaking, module 900 utilizes the information collected previously in modules 300, 500, and 700 to generate a processing plan which comes as close as possible to meeting organizational goals.

A task 902 extracts a virtual lot record from product demand memory structure 400, discussed above. Next, a task 904 extracts a process flow description to use in making plans. Manufacturing description 406 (see FIG. 4) from memory structure 400 identifies a specific process flow description 800 which task 904 may extract for planning module 900 to use as a template in evaluating the demands placed on manufacturing environment 10 by the virtual lot 14 identified in task 902.

Next, a task 906 is an initializing task that is performed only when and to the extent that MCCP process 200 has not previously been sufficiently initialized. Thus, for each resource which is potentially includable in the processing plan, task 906 initializes memory structures which characterize mortgages of resources 14 to actual lots 18 and virtual allocations of resources 14 to actual lots 18. However, to the extent that manufacturing environment 10 has previously experienced an actual lot 18 to which these resources have been allocated, task 906 is not needed. Specifically, task 906 communicates with vector manager 30, which in turn communicates with resource-lot coordinator 34. Coordinator 34 sets up a dependency memory structure 1000, discussed below, to reflect allocations of resources to actual lots 18. At initialization a resource is not allocated to any actual lot 18. Vector manager 30 sets up a vector memory structure 1100, discussed below, to represent mortgaged commitments of virtual allocations of resources 14, or portions thereof, to actual lots 18. Of course, at initialization few or no mortgages exist, and attribute capacities are listed at maximum limits from the then-current time indefinitely into the future. Resource definitions and limits may be obtained from inventory attribute information memory structure 600, retained in disk memory 28 (see FIG. 1).

After task 906, a task 908 performs planning or scheduling activities. Task 908 relies upon data from memory structures 1000 and 1100 in formulating this plan. Specifically, memory structure 1000 provides a then-current description of allocations of resources 14 to actual lots 18, and memory structure 1100 provides a time-valued description of capabilities available for scheduling to virtual lots 14.

FIG. 10 shows a block diagram of dependency memory structure 1000 which, in real time, records and maintains information describing allocations of resources 14 to actual lots 18. Specifically, memory structure 1000 includes any number of dependency (see TABLE I) data elements 1002. Data elements 1004, describing the actual lots 18, and data elements, 1006 describing the resources 14, contained within a dependency are associated with their own dependency element 1002. Any number of actual lots 18 and resources 14 may be included within a dependency, and memory structure 1000 may include any number of data elements 1004 and 1006 associated with a single dependency data element 1002.

Each lot data element 1004 includes its own data elements 1008. Elements 1008 describe a then-current queue and a priority for the corresponding actual lot 18. In addition, elements 1008 and resource elements 1006 each include linkages which point to specific usage nodes 1010. Each of usage nodes 1010 define a predicted specific usage of a resource 14 by an actual lot 18. Thus, a usage node 1010 describes a virtual allocation of a resource 14 to an actual lot 18. Usage nodes are linked to one another through linkage elements 1012. Elements 1012 allow traversal through usage nodes 1010 in a manner that indicates the order in which a single resource 14 is scheduled to be used by various actual lots 18 or in a manner that indicates the order in which various resources 14 are scheduled to be used by a single actual lot 18.

Each usage node 1010 also includes data elements 1014 and 1016, which respectively specify a scheduled time at which a resource 14 is to be consumed by an actual lot 18 and a scheduled time at which a resource 14 is to be released by the actual lot 18. Dependency memory structure 1000 is discussed in more detail in the above-listed "Resource-Lot Association Coordinator" patent reference.

FIG. 11 shows a block diagram of vector memory structure 1100. Accordingly, structure 1100 maintains a record for each of any number of resources 1102. Each resource 1102 has any number of time values 1104 associated with it, preferably in increasing order starting near the then-current time. Time values 1104 indicate the points in time at which capabilities of an attribute associated with the resource are to change. Since, each resource may have many attributes associated with it, each time value 1104 and resource 1102 may have any number of attributes 1106 associated therewith. Thus, as a resource is mortgaged for future use by actual lots 18, its available capability 1106 is adjusted to reflect that mortgage. Generally speaking, a capacity type of attribute capability decreases at the point in time where the mortgaged commitment takes effect (i.e. where the resource 14 is consumed) and increases at the point in time where the mortgaged commitment is removed (i.e. the resource 14 is released). Vector memory structure 1100 is discussed in more detail in the above-referenced "Means and Method for Managing Manufacturing or Other Resources" patent reference.

With reference back to FIG. 9, the allocation data is fed to vector manager 30 to update resource capability information, and this current resource capability information is used by task 908 in scheduling the virtual lot 16 identified above in task 904.

Figure 12:
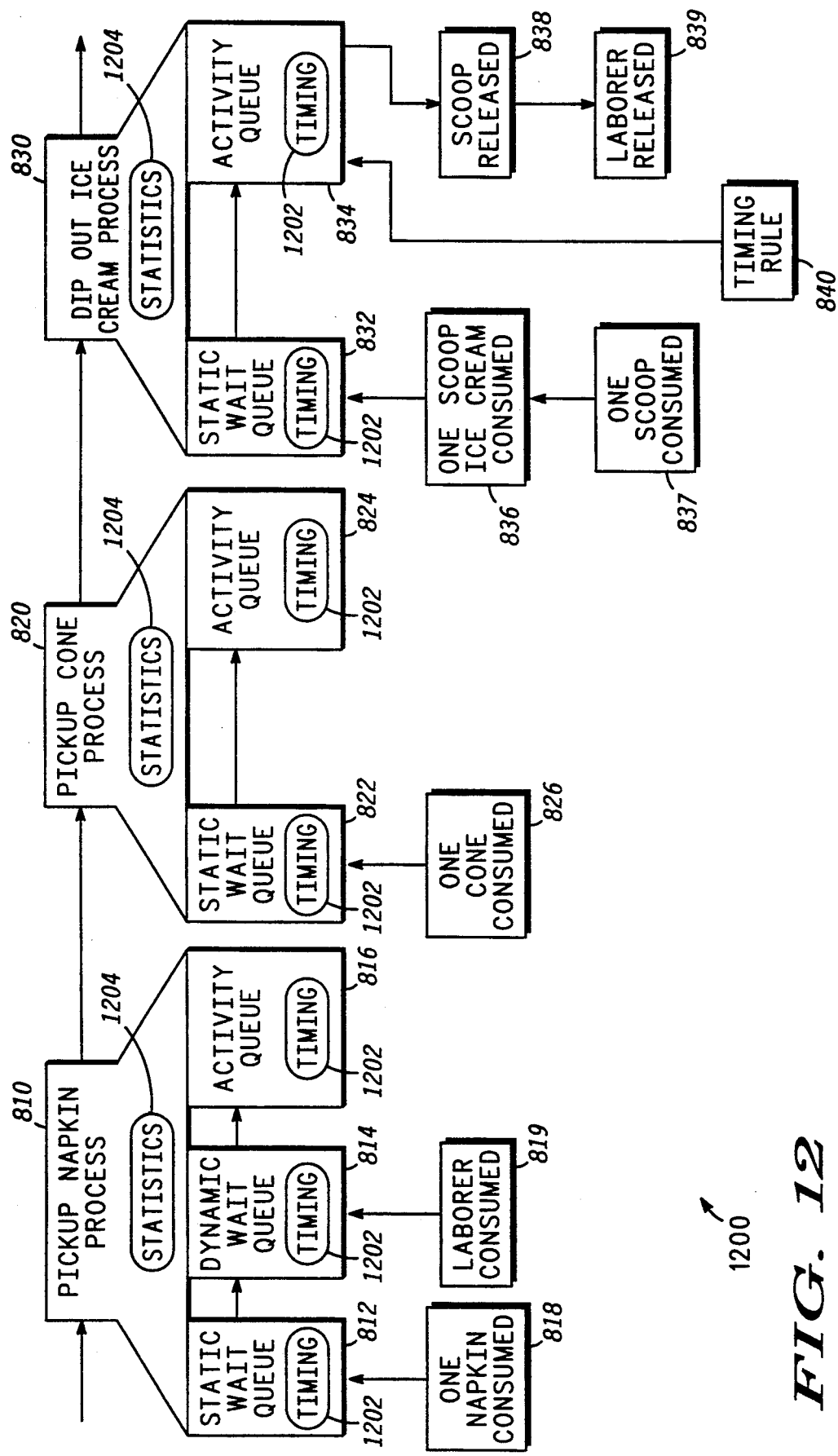
FIG. 12 shows a block diagram of a processing plan memory structure portion of the present invention.

Task 908 generates a processing plan memory structure 1200, as shown in FIG. 12. Plan 1200 is retained in disk memory 28 (see FIG. 1). FIG. 12 continues to describe the extremely simple, specific job of making a single, one-scoop ice cream cone begun in connection with FIG. 8. Of course, those skilled in the art will appreciate that processing plan 1200 is not limited to this or any other specific application, and that the processing plan depicted in FIG. 12 is presented to aid the understanding of the present invention. Processing plan 1200 includes much of the information obtained from process flow description 800 in task 904. Thus, processing plan 1200 includes data elements describing processes, such as processes 810, 820, and 830, which are linked together and to data elements describing queues, such as queues 812, 814, 816, 822, 824, 832, and 834. In addition, processing plan 1200 includes data elements describing resource requirements, associated attribute capability requirements, and manufacturing rule identifiers, such as elements 818, 819, 826, and 836-840, which are linked to appropriate processes.

Moreover, task 908 (see FIG. 9) associates timing data elements 1202 with each of the queues included in processing plan 1200. In general, timing data elements 1202 specify a predicted starting or entry time and stopping or exit time for each queue. Elements 1202 are obtained from scheduling available capabilities of the required resources, as determined from vector memory structure 1100 and process flow description 800. Moreover, this scheduling occurs in a manner which prevents violation of manufacturing rules, such as rule 840. If needed resource attribute capabilities are not available, then overall scheduling is delayed until the required capabilities are available in a manner that will not violate any manufacturing rules. Preferably, task 908 cooperatively simulates manufacturing environment 10 on all affected lots 16–18 and resources 14 to achieve an optimal, balanced allocation of resources to lots. Such a simulation is similar to that described in more detail in the above-listed "Method of Controlling the Execution of Organizational Plans" patent reference.

In addition, the memory structure which serves as processing plan 1200 preferably includes or makes provisions for data elements 1204 to record process data. Such data elements permit description of feedback, statistical, and status data which result from attempting to actually execute processing plan 1200 and from comparing a subsequent actual allocation with the virtual allocation described by processing plan 1200. Such feedback, statistical, and status data may be analyzed to suggest improvements in process flow description 800 to allow future processing plans 1200 to more closely mimic actual allocations.

With reference back to FIG. 9, after task 908 completes processing plan 1200, a task 910 causes tasks 902-908 to be repeated to make other processing plans for any additional virtual lot 16 demands placed on manufacturing environment 10. When all virtual lots 16 specified in product demand memory structure 400 have been processed, a task 912 examines all processing plans 1200 to determine if the plans 1200 meet organizational goals. The present invention contemplates either full automation of task 912 or an interactive activity with users 24 (see FIG. 1). The organizational goals to be achieved will be unique to each organization. Such goals may, for example, relate to efficient utilization of resources 14, or to meeting production deadlines with respect to specific products. If task 912 determines that organizational goals have been met, then planning module 900 of MCCP process 200 (see FIG. 2) is complete.

On the other hand, when task 912 determines that processing plans 1200 do not yet satisfy organizational goals, a task 914 alters one or more of process variable 404 (see FIG. 4) and repeats tasks 904-910. By altering process variables 404 the effects of different lot sizes, different lot priorities, and other process variables may be simulated until optimal processing plans 1200, with respect to organizational goals, are achieved or approached as closely as possible.

After completion of planning module 900, task 202 (see FIG. 2) operates to convert selected virtual lots 16 into actual lots 18. After this conversion, the newly converted actual lots 18 are processed through execution control module 1300.

Figure 13:
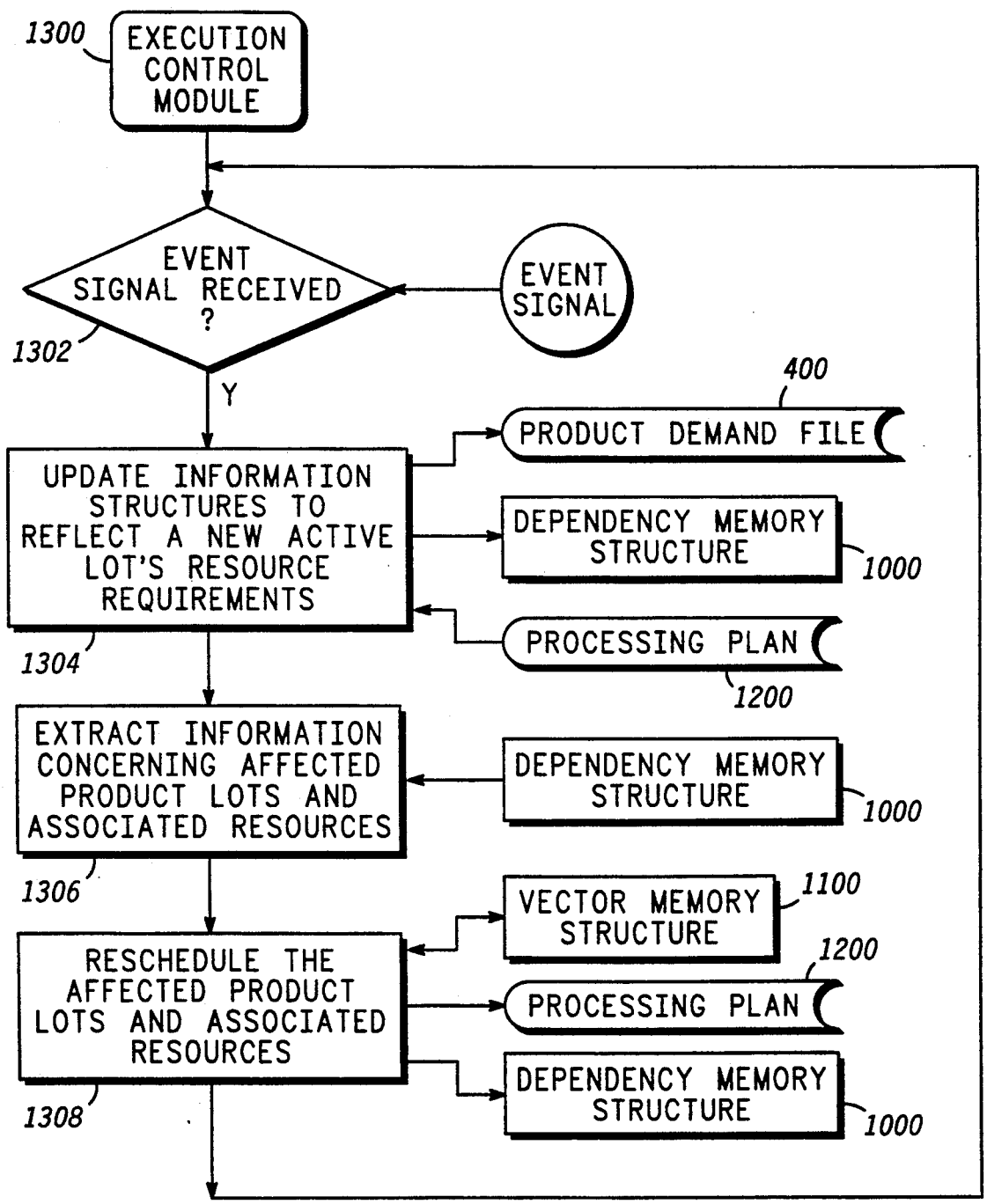
FIG. 13 shows a flow chart of an execution control module of the present invention.

FIG. 13 shows a flow chart of execution control module 1300. In the preferred embodiment, module 1300 activates upon the receipt of an event signal. An event signal may indicate that some event has occurred in manufacturing environment 10 which affects or may have an effect on virtual allocations of resources 14 to actual lots 18. The receipt of a message indicating that a virtual lot 14 has been converted into an actual lot 18 represents one such event. Alternately, the event signal may be generated in response to the passage of a predetermined period of time. In this situation, execution control module 1300 is able to detect if events within manufacturing environment 10 that should have occurred, actually did occur. With either type of event signal, execution control module 1300 waits at a task 1302 until the event signal is received.

For an event where actual lot 18 has been newly converted from a virtual lot 16, a task 1304 updates dependency memory structure 1000 and product demand memory structure 400 (see FIG. 4) to reflect the new actual lots 18 and their new status (i.e. as actual lots 18). This updating information may be obtained from processing plan 1200 (see FIG. 12) or directly from a message sent from planner 26 (see FIG. 1). After task 1304, a task 1306 extracts information which identifies dependencies (see TABLE I) by communicating with dependency memory structure 1000 (see FIG. 10). The identification of dependencies groups information concerning specific ones of actual lots 18 and resources 14 into separate categories. Separation of categories allows execution control module 1300 to operate upon data which describes only a subset of the entire manufacturing environment 10 at any one time rather than the whole environment 10. As a result, the size of problems solved by execution control module 1300 are reduced, and processing requirements for execution control module 1300 are reduced as well.

After task 1306, a task 1308 simulates manufacturing environment 10 with respect to a single dependency at a time. In conjunction with this simulation, resource to actual lot allocations recorded in dependency memory structure 1000 (see FIG. 10) change to indicate a then-current schedule. Likewise, the new then-current schedules are reflected in vector memory structure 1100. Moreover, instructions may be issued to move actual lots 18 between queues. Furthermore, as actual lots 18 move between queues, task 1308 updates processing plan 1200 to reflect the corresponding actual allocations. This information serves as feedback in modifying processing plan 1200 so that it may more closely mimic future actual allocations. After task 1308, execution control module loops back to task 1302 to wait for another event signal. As discussed above, so long as actual lot 18 has not yet been completed, its manufacturing execution is controlled by execution control module 1300. Execution control module 1300 is discussed in more detail in the above-listed "Method of Controlling the Execution of Organizational Plans" patent reference.

In summary, MCCP system 12 (see FIG. 1) and MCCP process 200 (see FIG. 2) provide an improved system and method for virtually and actually allocating resources to lots within an organization. As a result, actual allocations can closely mimic virtual allocations. The virtual allocations are based on resource allocation and mortgage data which are current at the time virtual allocations are made due to the operation of execution control module 1300. The memory structures utilized in the present invention permit the recording of comprehensive data concerning lots, resources, and process flows. Moreover, MCCP system 12 and MCCP process 200 allow feedback information to be utilized to build comprehensive and accurate data structures which precisely reflect particular manufacturing environments 10. With close mimicry of actual allocations to virtual allocations, organizations can begin to achieve optimal actual allocations of resources to lots.

The present invention has been described above with reference to a preferred embodiment. However, those skilled in the art will recognize that changes and modifications may be made in this preferred embodiment without departing from the scope of the present invention. For example, each of the above-described memory structures may include additional data elements which further help improve the accuracy of virtual allocations. Moreover, the specific modules and tasks, and their relationships to one another, described above may be substantially altered by those skilled in the art to achieve substantially the same functions. These and other changes and modifications which are obvious to those skilled in the art are intended to be included within the scope of the present invention.

What is claimed is:

1. A method of controlling the allocation of resources to lots in accordance with goals of an organization, said method comprising the steps of:

defining a process flow description for a virtual lot wherein resource capabilities are specified and are associated with one another in a specified order;

associating portions of unmortgaged future resource capabilities with one another in accordance with corresponding ones of said resource capabilities of said process flow description to generate a processing plan;

repeating said defining and associating steps if said processing plan fails to substantially satisfy said organizational goals;

selecting said virtual lot for processing within said organization as an actual lot;

mortgaging said future resource capabilities identified in said processing plan; and continuously revising said mortgaged resource capabilities of said mortgaging step in response to actual events occurring within said organization.

2. A method as claimed in claim 1 additionally comprising, prior to said defining step, the steps of:
identifying resources available for use within said organization;
identifying attributes of said resources; and
identifying capability limits of said attributes.

3. A method as claimed in claim 2 wherein said identifying attributes step comprises the step of selecting all qualities of said resources which are relevant to actual processing of each of said lots as said identified attributes.

4. A method as claimed in claim 2 additionally comprising the step of identifying a resource set in which resources that may be substituted for one another during actual processing of said lots are grouped together.

5. A method as claimed in claim 1 wherein:
prior to said defining step, said method additionally comprises the steps of:
associating a process variable with said virtual lot, assigning a value to said process variable, and
linking said virtual lot to said process flow description; and
said repeating step comprises the step of varying said value assigned to said process variable if said processing plan fails to satisfy said organizational goals.

6. A method as claimed in claim 1 wherein said continuously revising step comprises the step of updating said processing plan in response to actual events occurring within said organization.

7. A method of controlling the allocation of resources to lots in accordance with goals of an organization, said method comprising the steps of:
defining an ordered sequence of tasks needed to bring a virtual lot to completion wherein resource capabilities are specified and are associated with one another in a specified order;
identifying a first set of said tasks in which said resources are consumed;
identifying a second set of said tasks in which said resources are released;
identifying attributes and capabilities of said resources which are required by said virtual lot;
associating portions of unmortgaged future resource capabilities with one another in accordance with corresponding ones of said resource capabilities of said process flow description to generate a processing plan;
repeating said defining and associating steps if said processing plan fails to substantially satisfy said organizational goals;
selecting said virtual lot for processing within said organization as an actual lot;
mortgaging said future resource capabilities identified in said processing plan; and
continuously revising said mortgaged resource capabilities of said mortgaging step in response to actual events occurring within said organization.

8. A method as claimed in claim 7 wherein said defining a process flow description step further comprises the step of specifying process rules to follow while bringing said virtual lot to completion.

9. A method as claimed in claim 8 wherein said defining a process flow description step further comprises the step of evaluating said ordered sequence of tasks, said resource attributes and capabilities, and said process rules to establish feasibility of said process flow description.

10. A method as claimed in claim 7 wherein:
prior to said defining step, said method additionally comprises the step of saving data descriptive of said virtual lot and data descriptive of additional virtual lots in a first file;
said defining a process flow description step saves said data descriptive of said process flow and data descriptive of additional process flows in a second file; and said associating step comprises the steps of:
retrieving said virtual lot data from said first file;
retrieving said process flow description data from said second file; and
repeating said getting steps for said additional virtual lots and said additional process flow descriptions.

11. A system for controlling the allocation of resources to lots in accordance with goals of an organization, said system comprising:
a first memory structure for retaining process flow description data associated with virtual lots, said process flow description data specifying, for each of said virtual lots, resources associated with one another in a specified order and capabilities required of said resources by said virtual lot;
a second memory structure for retaining data describing future mortgaged capabilities of resources;
means, coupled to said first and second memory structures, for associating, for a specified one of said virtual lots, portions of unmortgaged future resource capabilities with one another in accordance with corresponding ones of said resource capabilities of said process flow description to generate a processing plan;
a third memory structure for retaining data descriptive of said processing plan;
a fourth memory structure for retaining data descriptive of future allocations of resources to actual lots; and
means, coupled to said third and fourth memory structures, for converting said virtual lot into an actual lot and for controlling execution of said processing plan to bring said actual lot to completion.

12. A system as claimed in claim 11 wherein said converting and controlling means continuously revises said fourth memory structure while said actual lot is being brought to completion.

13. A system as claimed in claim 11 wherein said means for converting and controlling couples to said second memory structure and is configured to mortgage said future resource capabilities identified in said processing plan.

14. A system as claimed in claim 13 wherein said means for converting and controlling is further configured to continuously revise said mortgaged resource capabilities in response to actual events occurring within said organization.

15. A system as claimed in claim 11 additionally comprising:
 a fifth memory structure for retaining data descriptive of resources available for use within said organization, attributes of said resources available for use within said organization, and capability limits of said attributes;
 a sixth memory structure for retaining data descriptive of said virtual lots; and
 means, coupled to said first, fifth, and sixth memory structures, for merging said resource data of said fifth memory structure with said virtual lot data of said sixth memory structure to produce said process flow description data.

16. A method of controlling the allocation of resources to lots in an organization in accordance with organizational goals, said method comprising the steps of:
 distinguishing resource commitments from uncommitted resource capabilities;
 identifying a virtual lot for control within said organization;
 identifying resources needed by said virtual lot;
 defining a process flow description for said virtual lot in which resources are associated with one another in a specified order and capabilities of said resources included in said process flow description are specified;
 forming a processing plan by:
 identifying a portion of said actual uncommitted resource capabilities which corresponds to said capabilities of said defining step, and
 scheduling usage of said portion in accordance with said process flow description;
 updating said actual resource commitments to reflect said processing plan if said processing plan substantially accommodates said organizational goals; and
 continually updating said actual resource commitments to reflect actual events occurring within said organization.

17. A method as claimed in claim 16 additionally comprising, prior to said defining step, the steps of:
 identifying resources available for use within said organization;
 identifying attributes of said resources; and
 identifying capability limits of said attributes.

18. A method of controlling the allocation of resources to lots in an organization in accordance with organizational goals, said method comprising the steps of:
 distinguishing resource commitments from uncommitted resource capabilities;
 identifying a virtual lot for control within said organization;
 identifying resources needed by said virtual lot;
 identifying resources available for use within said organization;
 identifying attributes of said resources;
 identifying capability limits of said attributes;
 defining an ordered sequence of tasks needed to bring said virtual lot to completion in which resources are associated with one another in a specified order and capabilities of said resources included in said process flow description are specified;
 identifying a first set of said tasks in which said resources of said defining step are consumed;
 identifying a second set of said tasks in which said resources of said defining step are released;
 identifying attributes and capabilities of said resources which are required by said virtual lot;
 forming a processing plan by;
 identifying a portion of said actual uncommitted resource capabilities which corresponds to said capabilities of said defining step, and
 scheduling usage of said portion in accordance with said process flow description;
 updating said actual resource commitments to reflect said processing plan if said processing plan substantially accommodates said organizational goals; and
 continually updating said actual resource commitments to reflect actual events occurring within said organization.

19. A method as claimed in claim 18 wherein:
 identifying a virtual lot step comprises the steps of:
 associating a process variable with said virtual lot, assigning a value to said process variable, and
 linking said virtual lot to said process flow description; and
 said updating said actual resource commitments step comprises the steps of:
 varying said value assigned to said process variable if said processing plan fails to satisfy said organizational goals, and
 repeating said forming step when said processing plan fails to satisfy said organizational goals.

20. A method as claimed in claim 19 wherein said continuously updating step comprises the step of updating said processing plan in response to actual events occurring within said organization.

* * * * *